(12) United States Patent
Lee et al.

(10) Patent No.: US 11,393,474 B2
(45) Date of Patent: Jul. 19, 2022

(54) ELECTRONIC DEVICE MANAGING PLURALITY OF INTELLIGENT AGENTS AND OPERATION METHOD THEREOF

(71) Applicant: SAMSUNG ELECTRONICS CO., LTD., Suwon-si (KR)

(72) Inventors: Yoonju Lee, Suwon-si (KR); Jaeyung Yeo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 177 days.

(21) Appl. No.: 16/940,888

(22) Filed: Jul. 28, 2020

(65) Prior Publication Data

US 2021/0043205 A1 Feb. 11, 2021

(30) Foreign Application Priority Data

Aug. 5, 2019 (KR) .................. 10-2019-0095059

(51) Int. Cl.
  *G10L 15/22* (2006.01)
  *G10L 15/18* (2013.01)
  *G10L 15/30* (2013.01)

(52) U.S. Cl.
  CPC .......... *G10L 15/22* (2013.01); *G10L 15/1815* (2013.01); *G10L 15/30* (2013.01); *G10L 2015/223* (2013.01)

(58) Field of Classification Search
  CPC ................................. G10L 15/22; G10L 15/30
  See application file for complete search history.

(56) References Cited

U.S. PATENT DOCUMENTS 9,485,231 B1  11/2016  Reese
9,633,661 B1   4/2017  Typrin et al.
(Continued)

FOREIGN PATENT DOCUMENTS

KR  10-2016-0048169   5/2016
KR  10-2017-0027647   3/2017
(Continued)

OTHER PUBLICATIONS

European Search Report dated Jan. 15, 2021 in corresponding European Application No. 20188300.6.
(Continued)

*Primary Examiner* — Ibrahim Siddo
(74) *Attorney, Agent, or Firm* — Nixon & Vanderhye, P.C.

(57) ABSTRACT

An electronic device configured to support a first speech-based intelligent agent may include: a communication circuit, a processor operatively connected to the communication circuit, and a memory operatively connected to the processor. The memory may store instructions which, when executed, cause the processor to control the electronic device to: receive speech data from a user terminal through the communication circuit, process the speech data to generate text data, identify a device intended to be controlled through analysis of the text data, receive information on an intelligent agent supported by the identified device from a first external server through the communication circuit, and determine whether to transmit the speech data to a second external server supporting a second speech-based intelligent agent based on the information on the intelligent agent supported by the identified device.

20 Claims, 16 Drawing Sheets

(56) References Cited

U.S. PATENT DOCUMENTS

| | | | |
|---|---|---|---|
| 10,261,830 B2 | 4/2019 | Gupta et al. | |
| 2015/0067154 A1 | 3/2015 | Ly et al. | |
| 2016/0314782 A1 | 10/2016 | Klimanis | |
| 2017/0076724 A1 | 3/2017 | Park et al. | |
| 2017/0236512 A1* | 8/2017 | Williams | G06F 40/40 |
| | | | 381/79 |
| 2019/0267001 A1* | 8/2019 | Byun | G10L 15/26 |
| 2020/0236230 A1 | 7/2020 | Kim et al. | |
| 2021/0134294 A1 | 5/2021 | Kirazci et al. | |

FOREIGN PATENT DOCUMENTS

| | | |
|---|---|---|
| KR | 10-2019-0054707 | 5/2019 |
| KR | 10-2019-0069380 | 6/2019 |
| KR | 10-2019-0070906 | 6/2019 |
| KR | 10-2021-0103208 | 8/2021 |
| WO | 2017/139533 | 8/2017 |

OTHER PUBLICATIONS

International Search Report dated Oct. 30, 2020 in corresponding International Application No. PCT/KR2020/009805.

* cited by examiner

FIG. 14
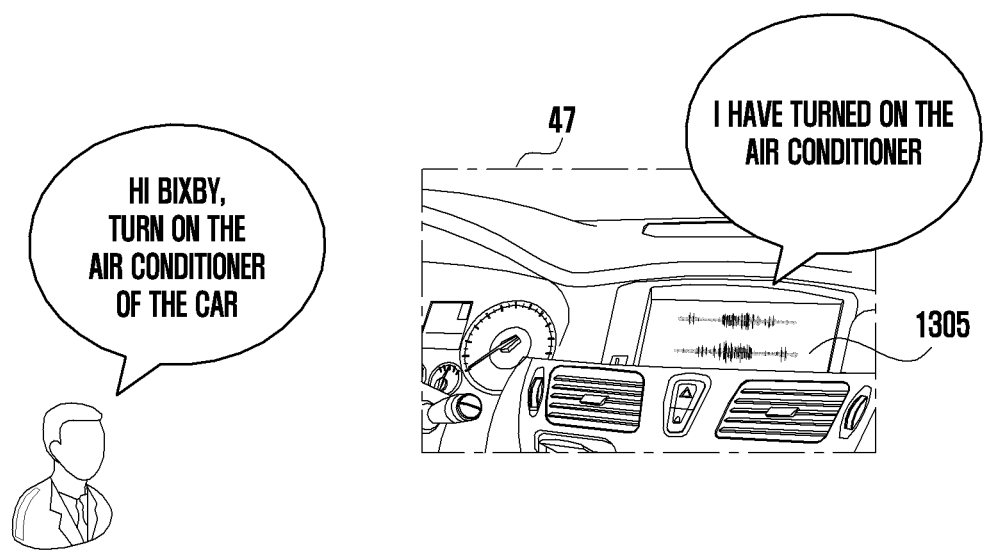
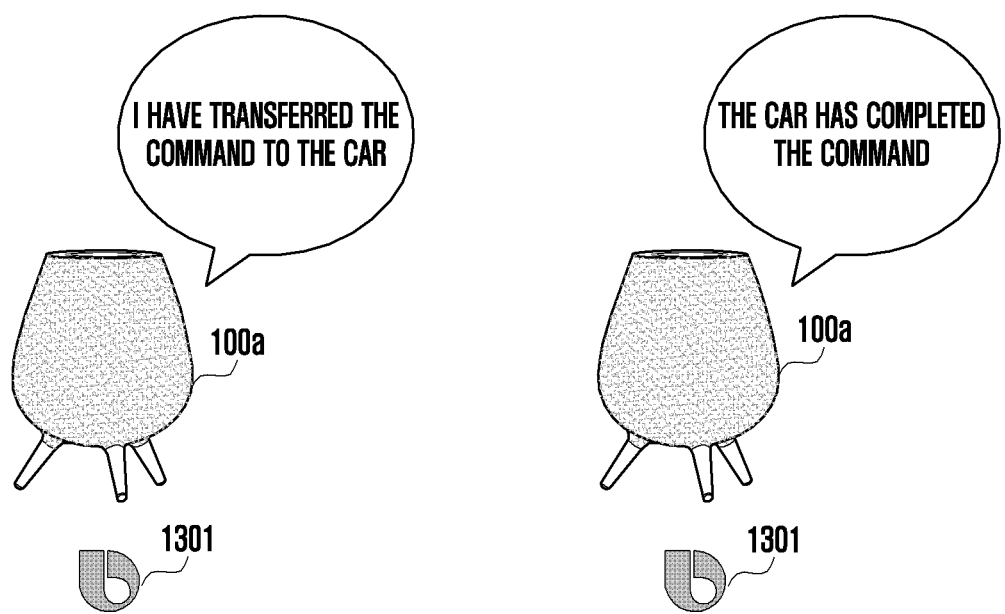

ELECTRONIC DEVICE MANAGING PLURALITY OF INTELLIGENT AGENTS AND OPERATION METHOD THEREOF

CROSS-REFERENCE TO RELATED APPLICATION

This application is based on and claims priority under 35 U.S.C. § 119 to Korean Patent Application No. 10-2019-0095059, filed on Aug. 5, 2019, in the Korean Intellectual Property Office, the disclosure of which is incorporated by reference herein in its entirety.

BACKGROUND

Field

The disclosure relates to an electronic device managing a plurality of intelligent agents and an operation method thereof.

Description of Related Art

Services for electronic devices using intelligent agents have been popularized. An intelligent agent may provide an integrated function to a user by controlling several external devices functionally connected to an electronic device. An electronic device may provide a speech-based intelligent agent service, and a user of the electronic device may execute various functions of the electronic device using user's speech.

With the start of an application of the Internet of things in which user devices are connected to each other through a wired/wireless network to share information in user's living environment, it becomes possible to perform speech recognition with respect to other external devices connected through the network using various electronic devices, such as a television set, a refrigerator, and the like.

Electronic devices that provide speech-based intelligent agent functions in user's living environment are increasing. In the case where a plurality of speech-based intelligent agents exist, electronic devices respectively supporting the plurality of speech-based intelligent agents may coexist in the user's living environment. In order to control a specific device, a user should use a speech-based intelligent agent supported by the specific device. In other words, interlocking may not be possible between heterogeneous speech-based intelligent agents.

SUMMARY

Embodiments of the disclosure provide an electronic device and operating method thereof that can control a device intended to be controlled by a user by identifying the device through processing of a received speech command (e.g., utterance) and transmitting speech data to an intelligent agent that can control the identified device based on information of the identified device. For example, even in the case where the speech command is input to one speech-based intelligent agent, a control command can be transferred even to a device that supports a heterogeneous speech-based intelligent agent.

According to various example embodiments of the disclosure, an electronic device configured to support a first speech-based intelligent agent may include: a communication circuit, a processor operatively connected to the communication circuit, and a memory operatively connected to the processor. According to various embodiments, the memory may store instructions which, when executed, cause the processor to control the electronic device to: receive speech data from a user terminal through the communication circuit, process the speech data to generate text data, identify a device intended to be controlled through analysis of the text data, receive information on an intelligent agent supported by the identified device from a first external server through the communication circuit, and determine whether to transmit the speech data to a second external server supporting a second speech-based intelligent agent based on the information on the intelligent agent supported by the identified device.

According to various example embodiments of the disclosure, an electronic device configured to support a first speech-based intelligent agent may include: a communication circuit, a processor operatively connected to the communication circuit, and a memory operatively connected to the processor. According to various example embodiments, the memory may store information on at least one device registered in an account and information on an intelligent agent supported by the at least one device, and the memory may store instructions which, when executed, cause the processor to control the electronic device to: receive speech data from a user terminal through the communication circuit, process the speech data to generate text data, identify a device intended to be controlled through analysis of the text data, identify information on an intelligent agent supported by the identified device based on the information on the at least one device registered in the account and the information on the intelligent agent supported by the at least one device stored in the memory, and determine whether to transmit the speech data to an external server supporting a second speech-based intelligent agent based on the identified information through the communication circuit.

According to various example embodiments of the disclosure, an electronic device configured to support a first speech-based intelligent agent may include: a communication circuit, a microphone, a processor operatively connected to the communication circuit and the microphone, and a memory operatively connected to the processor. According to various embodiments, the memory may store information on at least one device registered in a an account and information on an intelligent agent supported by the at least one device, and the memory may store instructions which, when executed, cause the processor to control the electronic device to: receive speech data through the microphone, process the speech data to generate text data, identify a device intended to be controlled through analysis of the text data, identify information on an intelligent agent supported by the identified device based on the information on the at least one device registered in the account and the information on the intelligent agent supported by the at least one device stored in the memory, and determine whether to transmit the speech data to an external electronic device supporting a second speech-based intelligent agent based on the information on the intelligent agent supported by the identified device through the communication circuit.

The electronic device according to the various example embodiments of the disclosure can control a device intended to be controlled by a user by identifying the device through processing of a received user's speech command (e.g., utterance) and transmitting user's speech data to an intelligent agent that can control the identified device based on information of the identified device. According to the various example embodiments, even in the case where the user's speech command is input to one speech-based intelligent agent, a control command can be transferred even to a device that supports a heterogeneous speech-based intelligent agent.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 14 is a diagram illustrating an example environment for controlling an electronic device supporting a second speech-based intelligent agent through a user terminal supporting a first speech-based intelligent agent according to an embodiment;

In relation to the description of the drawings, the same or similar reference numerals may be used for the same or similar constituent elements.

DETAILED DESCRIPTION

Figure 1:
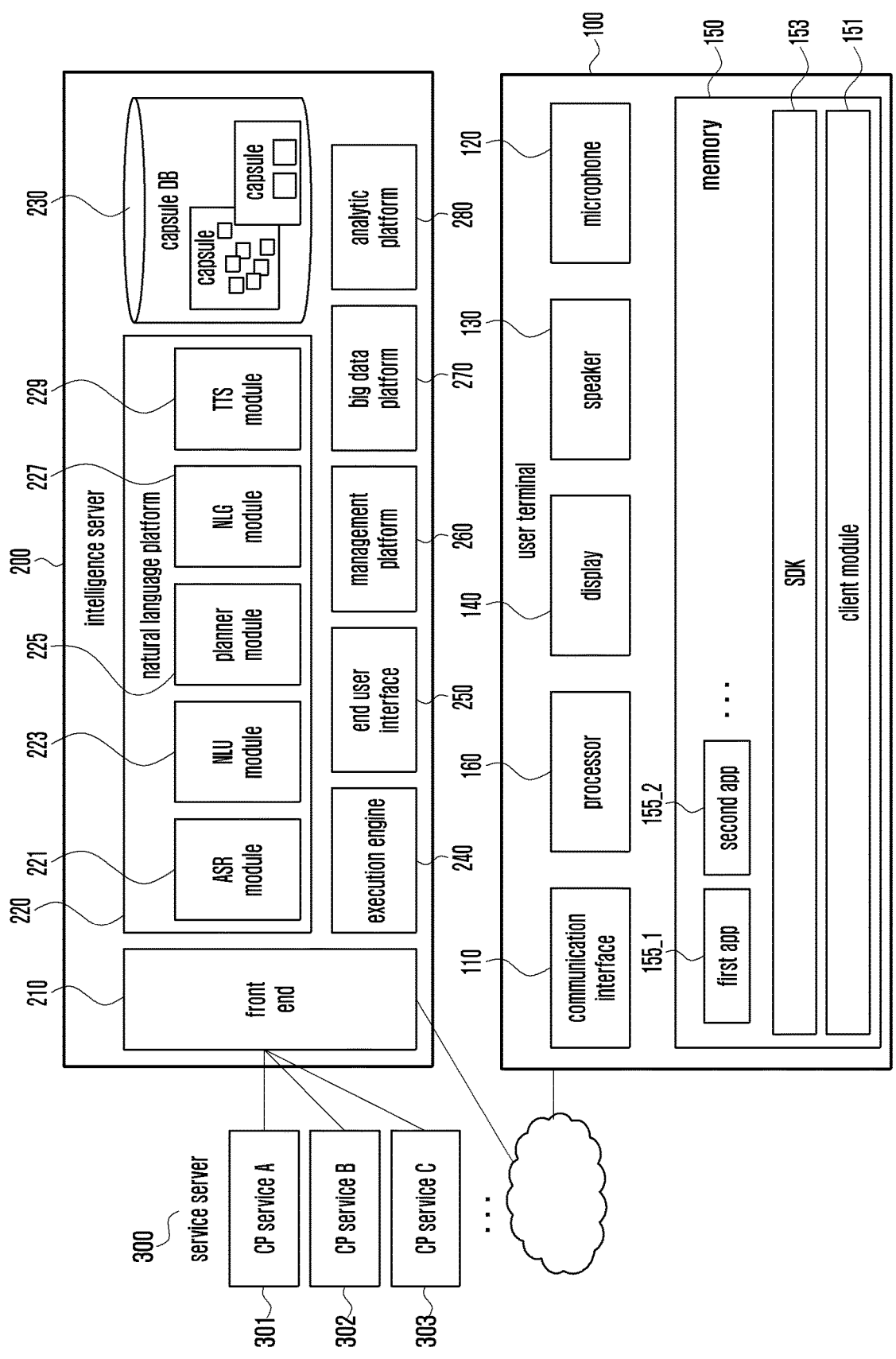
FIG. 1 is a block diagram illustrating an example integrated intelligence system according to an embodiment.

FIG. 1 is a block diagram illustrating an example integrated intelligence system according to an embodiment.

Referring to FIG. 1, the integrated intelligence system according to an embodiment may include a user terminal 100, an intelligent server 200, and a service server 300.

The user terminal 100 according to an embodiment may be a terminal device (or an electronic device) capable of being connected to the Internet, and may include, for example, a mobile phone, a smart phone, a personal digital assistant (PDA), a notebook computer, a TV, white goods, a wearable device, an HMD, or a smart speaker.

According to the embodiment, the user terminal 100 may include a communication interface 110, a microphone 120, a speaker 130, a display 140, a memory 150, or a processor 160. The listed elements may be operatively or electrically connected to each other.

The communication interface 110 according to an embodiment may be connected to an external device and configured to transmit and receive data. The microphone 120 according to an embodiment may receive a sound (for example, a user speech) and convert the same to an electrical signal. The speaker 130 according to an embodiment may output the electrical signal in the form of a sound (for example, voice). The display 140 according to an embodiment may be configured to display an image or a video. The display 140 according to an embodiment may display a graphic user interface (GUI) of an executed app (or application).

The memory 150 according to an embodiment store a client module 151, a software development kit (SDK) 153, and a plurality of apps 155. The client module 151 and the SDK 153 may configure framework (or a solution program) for performing a universal function. Further, the client module 151 or the SDK 153 may configure framework for processing a voice input.

The plurality of apps 155 may be programs for performing a predetermined function. According to an embodiment, the plurality of apps 155 may include a first app 155_1 and a second app 155_3. According to an embodiment, each of the plurality of apps 155 may include a plurality of operations for performing predetermined functions. For example, the apps may include an alarm app, a message app, and/or a schedule app. According to an embodiment, the plurality of apps 155 may be executed by the processor 160 so as to sequentially perform at least some of the plurality of operations.

The processor 160 according to an embodiment may control the overall operation of the user terminal 100. For example, the processor 160 may be electrically connected to the communication interface 110, the microphone 120, the speaker 130, and the display 140 to perform predetermined operations.

The processor 160 according to an embodiment may perform a predetermined function by executing a program stored in the memory 150. For example, the processor 160 may perform the following operation for processing a voice input by executing at least one of the client module 151 or the SDK 153. The processor 160 may control, for example, the operation of the plurality of apps 155 through the SDK 153. The following operation which is the operation of the client module 151 or the SDK 153 may be performed by the processor 160.

The client module 151 according to an embodiment may receive a voice input. For example, the client module 151 may receive a voice signal corresponding to a user speech detected through the microphone 120. The client module 151 may transmit the received voice input to the intelligent server 200. The client module 151 may transmit state information of the user terminal 100 along with the received voice input to the intelligent server 200. The state information may be, for example, execution state information of the app.

The client module 151 according to an embodiment may receive the result corresponding to the received voice input. For example, if the intelligent module 200 obtains the result corresponding to the received voice input, the client module 151 may receive the result corresponding to the received voice input. The client module 151 may display the received result on the display 140.

The client module 151 according to an embodiment may receive a plan corresponding to the received voice input. The client module 151 may display the result obtained by performing the plurality of operations of the app on the display 140 according to the plan. The client module 151 may sequentially display, for example, the execution result of the plurality of operations on the display. In another example, the user terminal 100 may display, only some result of the plurality of operations (only the result of the last operation) on the display.

According to an embodiment, the client module 151 may receive a request for acquiring information required for obtaining the result corresponding to the voice input from the intelligent server 200. According to an embodiment, the client module 151 may transmit the required information to the intelligent server 200 in response to the request.

The client module 151 according to an embodiment may transmit result information of the execution of the plurality of operations to the intelligent server 200 according to the plan. The intelligent server 200 may identify that the received voice input is correctly processed using the result information.

The client module 151 according to an embodiment may include a voice recognition module. According to an embodiment, the client module 151 may recognize a voice input for performing a limited function through the voice recognition module. For example, the client module 151 may execute an intelligent app for processing a voice input to perform an organic operation through a predetermined input (for example, Wake up!).

The intelligent server 200 according to an embodiment may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input on the basis of the text data.

According to an embodiment, the plan may be generated by an artificial intelligent (AI) system. The intelligent system may be a rule-based system, a neural network-based system (for example, a feedforward neural network (FNN)), or a recurrent neural network (RNN)). Alternatively, the intelligent system may be a combination thereof or an intelligent system different therefrom. According to an embodiment, the plan may be selected from a combination of predefined plans or generated in real time in response to a user request. For example, the intelligent system may select at least one plan from among a plurality of predefined plans.

The intelligent server 200 according to an embodiment may transmit the result of the generated plan to the user terminal 100 or transmit the generated plan to the user terminal 100. According to an embodiment, the user terminal 200 may display the result of the plan on the display. According to an embodiment, the user terminal 100 may display the result of the operation according to the plan on the display.

The intelligent server 200 according to an embodiment may include a front end 210, a natural language platform 220, a capsule DB 230, an execution engine 240, and end user interface 250, a management platform 260, a big data platform 270, or an analytic platform 280.

According to an embodiment, the front end 210 may receive the received voice input from the user terminal 100. The front end 210 may transmit a response to the voice input.

According to an embodiment, the natural language platform 220 may include an automatic speech recognition module (ASR module) 221, a natural language understanding (NLU) module 223, a planner module 225, natural language generator (NLG) module 227, or a text to speech (TTS) module 229.

The automatic speech recognition module 221 according to an embodiment may convert the voice input received from the user terminal 100 into text data. The natural language understanding module 223 according to an embodiment may detect a user's intention on the basis of text data of the voice input. For example, the natural language understanding module 223 may detect a user's intention by performing syntactic analysis or semantic analysis. The natural language understanding module 223 according to an embodiment may detect a meaning of a word extracted from the voice input on the basis of a linguistic characteristic of a morpheme or a phrase (for example, grammatical element) and match the detected meaning of the word and the intention so as to determine the user's intention.

The planner module 225 according to an embodiment may generate a plan on the basis of the intention determined by the natural language understanding module 223 and a parameter. According to an embodiment, the planner module 225 may determine a plurality of domains required for performing a task on the basis of the determined intention. The planner module 225 may determine a plurality of operations included in the plurality of domains determined on the basis of the intention. According to an embodiment, the planner module 225 may determine a parameter required for performing the plurality of determined operations or a result value output by the execution of the plurality of operations. The parameter and the result value may be defined by a concept of a predetermined type (or class). According to an embodiment, the plan may include a plurality of operations determined by the user's intention and a plurality of concepts. The planner module 225 may gradually (or hierarchically) determine the relationship between the plurality of operations and the plurality of concepts. For example, the planner module 225 may determine the execution order of the plurality of operations determined on the basis of the user's intention based on the plurality of concepts. In other words, the planner module 225 may determine the execution order of the plurality of operations on the basis of the parameter required for performing the plurality of operations and the result output by the execution of the plurality of operations. Accordingly, the planner module 225 may generate a plan including information on the relationship (ontology) between the plurality of operations and the plurality of concepts. The planner module 225 may generate a plan on the basis of information stored in the capsule database 230 that stores a set of relationships between concepts and operations.

The natural language generator module 227 according to an embodiment may convert predetermined information into the form of text. The information converted into the form of text may be the form of a natural language speech. The text to speech module 229 may convert information in the form of text into information in the form of voice.

According to an embodiment, some or all of the functions of the natural language platform 220 may also be implemented by the user terminal 100.

The capsule database 230 may store information on the relationship between a plurality of concepts and operations corresponding to a plurality of domains. The capsule according to an embodiment may include a plurality of operation objects (action objects or action information) and concept objects (or concept information). According to an embodiment, the capsule database 230 may store a plurality of capsules in the form of a concept action network (CAN). According to an embodiment, the plurality of capsules may be stored in a function registry included in the capsule database 230.

The capsule database 230 may include a strategy registry storing strategy information required when a plan corresponding to a voice input is determined. When there are a plurality of plans corresponding to the voice input, the strategy information may include reference information for determining one plan. According to an embodiment, the capsule database 230 may include a follow-up registry storing the following operation to suggest a follow-up operation to the user in a predetermined situation. The follow-up operation may include, for example, the following speech. According to an embodiment, the capsule database 230 may include a layout registry storing layout information corresponding to information output through the user terminal 100. According to an embodiment, the capsule database 230 may include a vocabulary registry storing vocabulary information included in the capsule information. According to an embodiment, the capsule database 230 may include a dialog registry storing dialog (or interaction) information with the user. The capsule database 230 may update the stored object through a developer tool. The developer tool may include a function editor for updating, for example, the operation object or the concept object. The developer tool may include a vocabulary editor for updating a vocabulary. The developer tool may include a strategy editor for generating and registering strategy to determine a plan. The developer tool may include a dialog editor for generating dialog with the user. The developer tool may include a follow-up editor for activating a follow-up goal and editing the following speech that provides a hint. The follow-up goal may be determined on the basis of the current goal, a user's preference, or an environment condition. According to an embodiment, the capsule database 230 may be implemented inside the user terminal 100.

The execution engine 240 according to an embodiment may obtain the result on the basis of the generated plan. The end user interface 250 may transmit the obtained result to the user terminal 100. Accordingly, the user terminal 100 may receive the result and provide the received result to the user. The management platform 260 according to an embodiment may manage information used by the intelligent server 200.

The big data platform 270 according to an embodiment may collect user data. The analytic platform 280 according to an embodiment may manage quality of service (QoS) of the intelligent server 200. For example, the analytic platform 280 may manage elements and a processing speed (or efficiency) of the intelligent server 200.

The service server 300 according to an embodiment may provide a predetermined service (for example, food ordering or hotel booking) to the user terminal 100. According to an embodiment, the service server 300 may be a server operated by a third party. The service server 300 according to an embodiment may provide information for generating a plan corresponding to the received voice input to the intelligent server 200. The provided information may be stored in the capsule database 230. Further, the service server 300 may provide result information of the plan to the intelligent server 200.

In the integrated intelligence system 10 described above, the user terminal 100 may provide various intelligent services to the user in response to the user input. The user input may include, for example, an input through a physical button, a touch input, or a voice input.

According to an embodiment, the user terminal 100 may provide a voice recognition service through an intelligent app (or a voice recognition app) stored in the user terminal 100. In this case, for example, the user terminal 100 may recognize a user speech (utterance) or a voice input received through the microphone and provide a service corresponding to the recognized voice input to the user.

According to an embodiment, the user terminal 100 may perform a predetermined operation on the basis of the received voice input along or together with the intelligent server and/or the service server. For example, the user terminal 100 may execute an app corresponding to the received voice input and perform a predetermined operation through the executed app.

According to an embodiment, when the user terminal 100 provides the service together with the intelligent server 200 and/or the service server, the user terminal may detect a user speech through the microphone 120 and generate a signal (or voice data) corresponding to the detected user speech. The user terminal may transmit the voice data to the intelligent server 200 through the communication interface 110.

The intelligent server 200 according to an embodiment may generate a plan for performing a task corresponding to the voice input or the result of the operation according to the plan in response to the voice input received from the user terminal 100. The plan may include, for example, a plurality of operations for performing a task corresponding to the voice input of the user and a plurality of concepts related to the plurality of operations. The concepts may be parameters input to execution of the plurality of operations or may be defined for result values output by the execution of the plurality of operations. The plan may include the relationship between the plurality of operations and the plurality of concepts.

The user terminal 100 according to an embodiment may receive the response through the communication interface 110. The user terminal 100 may output a voice signal generated by the user terminal 100 to the outside through the speaker 130 or output an image generated by the user terminal 100 to the outside through the display 140.

Figure 2:
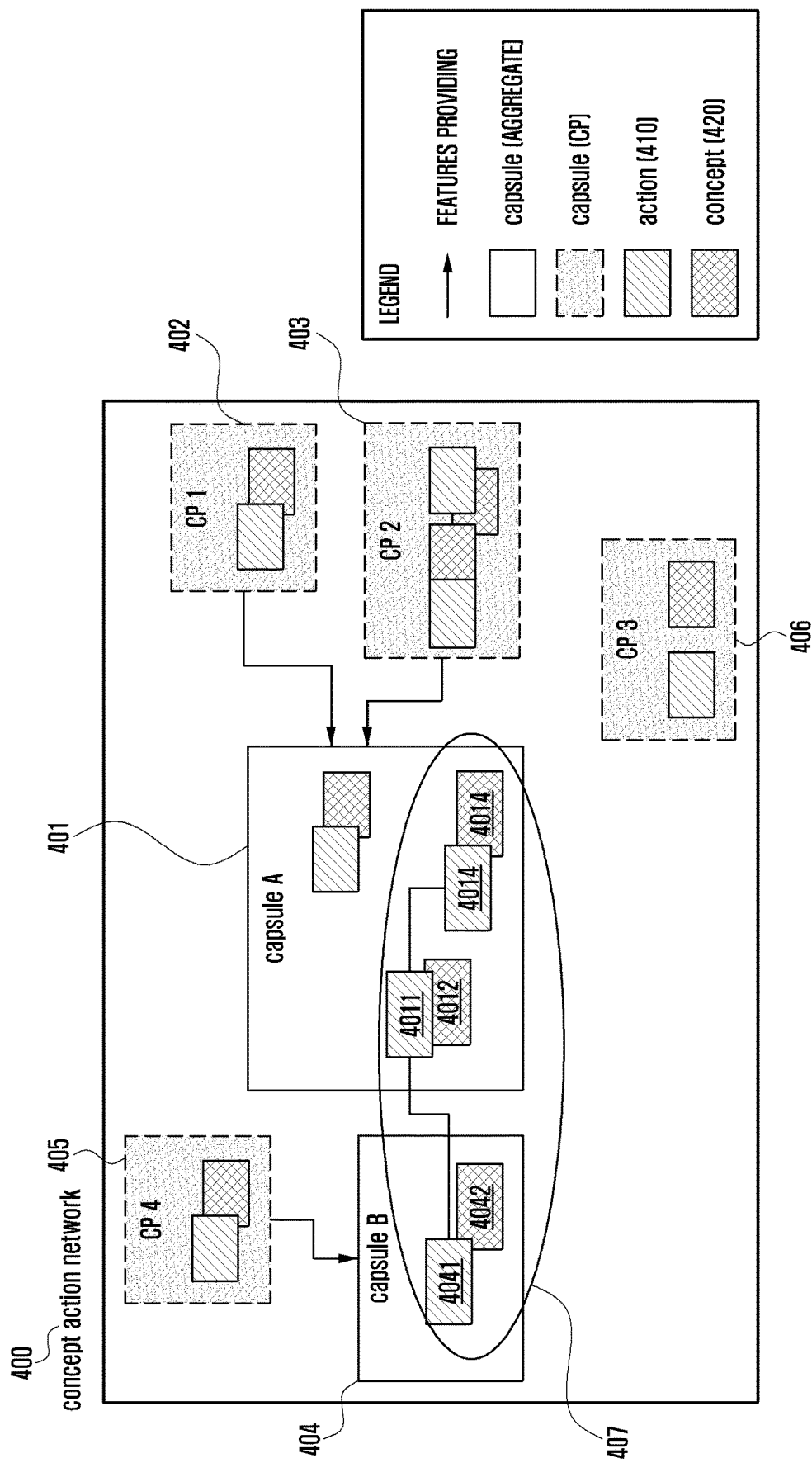
FIG. 2 is a diagram illustrating an example form in which concept-action relationship information is stored in a database according to an embodiment.

FIG. 2 is a diagram illustrating an example form in which information on the relationship between concepts and operations is stored in a database according to various embodiments.

A capsule database (for example, the capsule database 230) of the intelligent server 200 may store capsules in the form of a concept action network (CAN). The capsule database may store an operation for processing a task corresponding to a user voice input and a parameter required for the operation in the form of a concept action network (CAN).

The capsule database may store a plurality of capsules (capsule A 401 and capsule B 404) corresponding to a plurality of domains (for example, applications). According to an embodiment, one capsule (for example, capsule A 401) may correspond to one domain (for example, location (geo) or application). Further, one capsule may correspond to at least one service provider (for example, CP #1 402 and CP #2 403) for performing a function of a domain related to the capsule. According to an embodiment, one capsule may include one or more operations 410 for performing a predetermined function and one or more concepts 420.

The natural language platform 220 may generate a plan for performing a task corresponding to the received voice input through the capsules stored in the capsule database. For example, the planner module 225 of the natural language platform may generate a plan through capsules stored in the capsule database. For example, a plan 407 may be generated using operations 4011 and 4013 and concepts 4012 and 4014 of capsule A 401 and an operation 4041 and a concept 4042 of capsule B 404.

Figure 3:
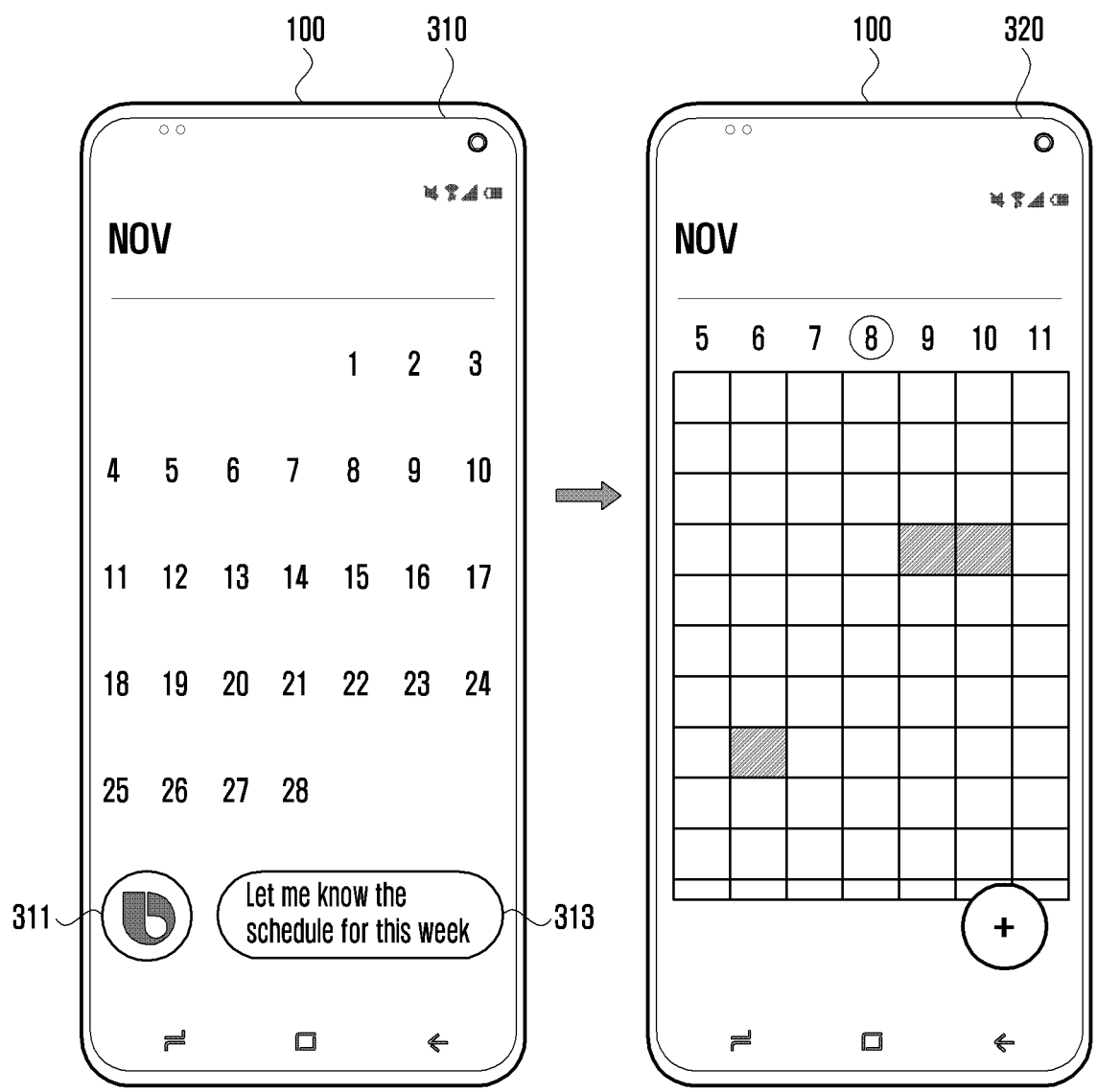
FIG. 3 is a diagram illustrating an example user terminal that displays a screen for processing a received speech input through an intelligent app according to an embodiment.

FIG. 3 is a diagram illustrating example screens on which the user terminal processes a received voice input through an intelligent app according to various embodiments.

The user terminal 100 may execute an intelligent app in order to process a user input through the intelligent server 200.

According to an embodiment, in a screen 310, when recognizing a predetermined voice input (for example, wake up!) or receiving an input through a hardware key (for example, a dedicated hardware key), the user terminal 100 may execute an intelligent app for processing the voice input. The user terminal 100 may execute the intelligent app in the state in which, for example, a schedule app is executed. According to an embodiment, the user terminal 220 may display an object 311 (for example, icon) corresponding to the intelligent app on the display 140. According to an embodiment, the user terminal 100 may receive the voice input by a user speech. For example, the user terminal 100 may receive the voice input "Let me know my schedule this week!". According to an embodiment, the user terminal 100 may display a user interface (UI) 313 (for example, an input window) of the intelligent app displaying text data of the received voice input on the display.

According to an embodiment, in a screen 320, the user terminal 100 may display the result corresponding to the received voice input on the display. For example, the user terminal 100 may receive a plan corresponding to the received user input and display the "schedule this week" according to the plan on the display.

Figure 4:
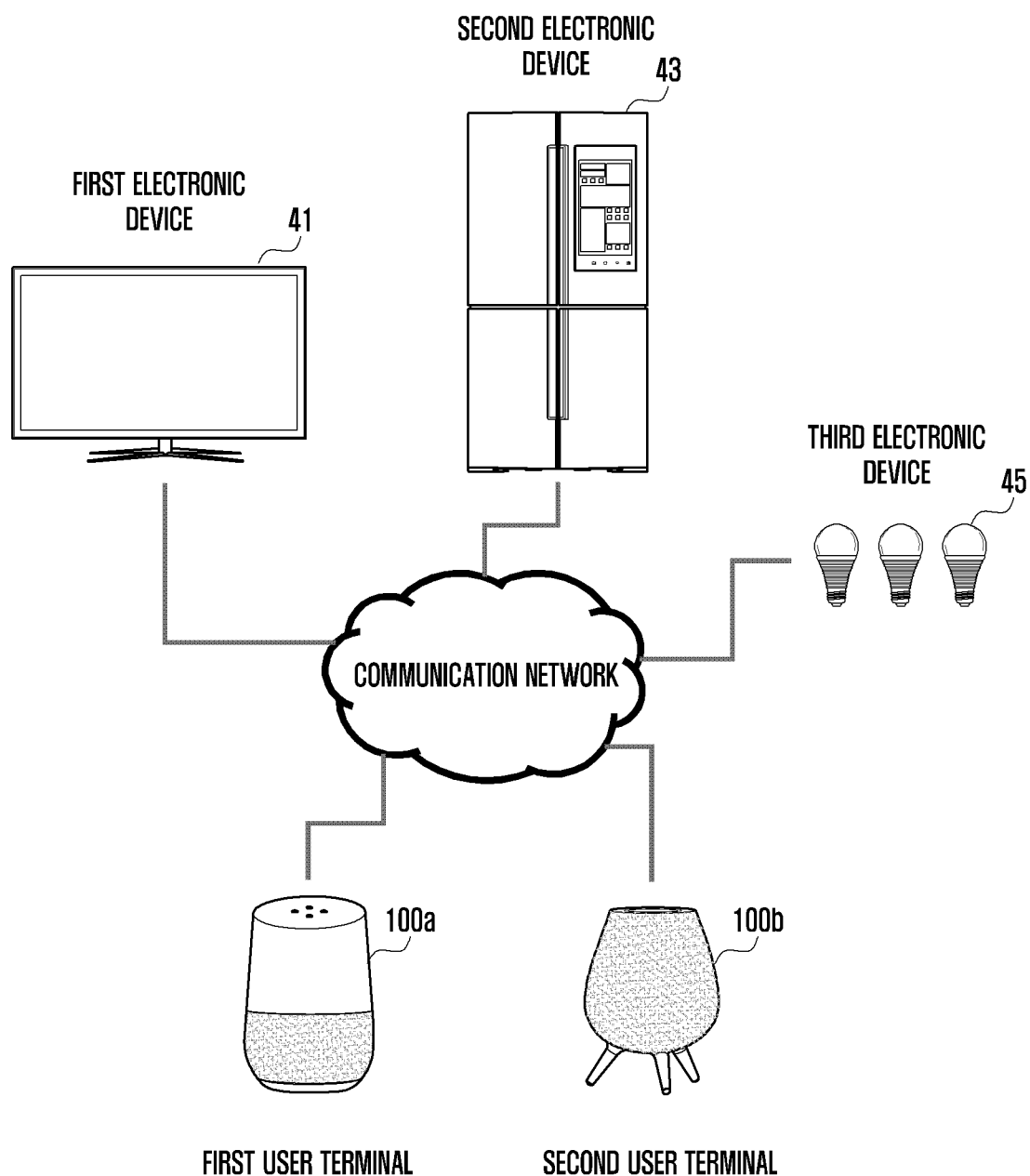
FIG. 4 is a diagram illustrating an example environment for supporting various speech-based intelligent agents according to an embodiment.

FIG. 4 is a diagram illustrating an example environment for supporting various speech-based intelligent agents according to an embodiment.

With reference to FIG. 4, according to various embodiments, devices supporting various speech-based intelligent agents may coexist, for example in a user's living environment. A speech-based intelligent agent may be, for example, a generic term calling software that performs a series of operations with autonomy and independence of predetermined levels based on speech recognition. The speech-based intelligent agent may be expressed as, for example, a speech-based intelligent assistant, an AI voice-assistant, or an intelligent virtual assistant.

According to an embodiment of the disclosure, a first user terminal 100a, a second user terminal 100b, a first electronic device 41, a second electronic device 43, and a third electronic device 45 may correspond to, for example, various kinds of Internet-connectable terminal devices, such as, for example, and without limitation, a speech recognition speaker (or AI speaker), a smart phone, a personal digital assistant (PDA), a notebook computer, and an electronic device to which IoT technology is applied (e.g., smart TV, smart refrigerator, smart lamp, or smart air purifier).

According to an embodiment of the disclosure, the first user terminal 100a, the second user terminal 100b, the first electronic device 41, the second electronic device 43, and the third electronic device 45 may provide services that are necessary for users through respective apps (or application programs) stored therein. For example, the first user terminal 100a and the second user terminal 100b may receive a user input for controlling an external electronic device through speech-based intelligent agent services (or speech recognition apps) stored therein. The user input may be received through, for example, a physical button, a touchpad, a speech input, or a remote input. For example, the first user terminal 100a and the second user terminal 100b may receive user's utterance, and may generate speech data corresponding to the user's utterance. The first user terminal 100a may transmit the generated speech data to a first intelligent server. The second user terminal 100b may transmit the generated speech data to a second intelligent server. The first user terminal 100a and the second user terminal 100b may transmit the generated speech data to the first intelligent server and the second intelligent server using a cellular network or a local area network (e.g., Wi-Fi or LAN).

It is assumed by way of non-limiting example for convenience of explanation that the first user terminal 100a is a user terminal that supports a first speech-based intelligent agent, and the second user terminal 100b is a user terminal that supports a second speech-based intelligent agent that is different from the first speech-based intelligent agent. It is assumed that the first electronic device 41 supports both the first speech-based intelligent agent and the second speech-based intelligent agent, the second electronic device 43 supports only the second speech-based intelligent agent, and the third electronic device 45 supports only the first speech-based intelligent agent.

In order to control the second electronic device 43, a user may select the second user terminal 100b that supports the second speech-based intelligent agent, and may input a speech command for controlling the second electronic device 43 to the second user terminal 100b. In order to control the third electronic device 45, the user may select the first user terminal 100a that supports the first speech-based intelligent agent, and may input a speech command for controlling the third electronic device 45 to the first user terminal 100a.

According to various embodiments of the disclosure, if a user's speech command is transferred to a certain user terminal, the user terminal may generate speech data corresponding to the user's speech command. The user terminal may transmit the speech data to an intelligent server related to the speech-based intelligent agent supported by the user terminal. The intelligent server may determine whether the speech data is speech data that can be processed by the speech-based intelligent agent. If the speech-based intelligent agent can process the speech data, the intelligent server can process the speech data. If the speech-based intelligent agent is unable to process the speech data, the intelligent server may transfer the speech data to an intelligent server related to another speech-based intelligent agent that can process the speech data.

For example, in the case where the user inputs the speech command for controlling the second electronic device 43 to the first user terminal 100a, the first speech-based intelligent agent supported by the first user terminal 100a may be unable to directly control the second electronic device 43 supporting the second speech-based intelligent agent. In this case, the first speech-based intelligent agent may transmit the user's speech command to the second speech-based intelligent agent to make the second speech-based intelligent agent control the second electronic device 43. According to an embodiment of the disclosure, it is possible to provide a system capable of controlling all electronic devices in a user's living environment to the user using one speech-based intelligent agent.

Figure 5:
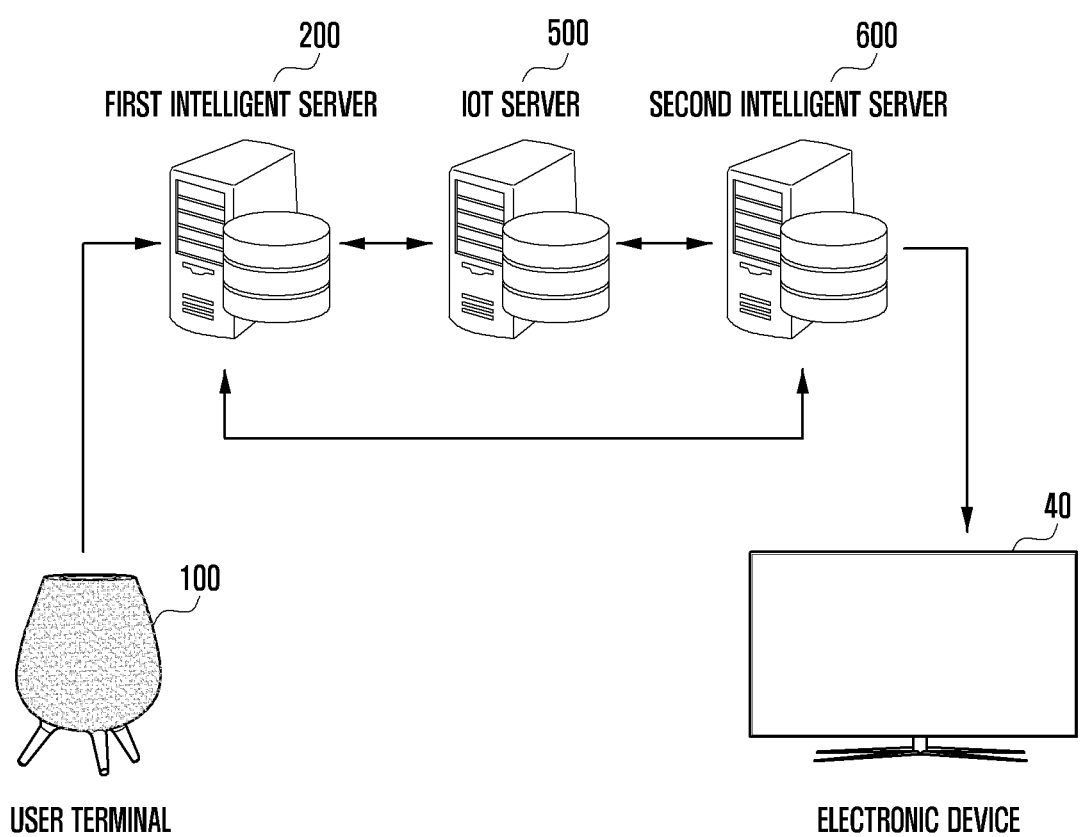
FIG. 5 is a diagram illustrating an example environment for controlling an electronic device supporting a second speech-based intelligent agent using a user terminal supporting a first speech-based intelligent agent according to an embodiment.

FIG. 5 is a diagram illustrating an example environment for controlling an electronic device supporting a second speech-based intelligent agent using a user terminal supporting a first speech-based intelligent agent according to an embodiment.

With reference to FIG. 5, it is assumed by way of non-limiting example for convenience of explanation that a user terminal 100 supports a first speech-based intelligent agent and an electronic device 40 supports a second speech-based intelligent agent.

According to an embodiment of the disclosure, the user terminal 100 may receive a wakeup utterance for executing the first speech-based intelligent agent through a microphone. For example, if a pre-designated speech (e.g., "Hi Bixby") is input through the microphone, the user terminal 100 can execute (call) the first speech-based intelligent agent. After the wakeup utterance is input, the user terminal 100 may receive various kinds of user's speech commands. The user terminal 100 may process the received user's speech command to speech data. For example, the user terminal 100 may generate the speech data corresponding to the user's speech command by preprocessing various operations for the received user's speech command, such as an operation of removing an echo included in the received user's speech command, an operation of removing a background noise included in the speech command, and an operation of adjusting the volume included in the speech command. The user terminal 100 may transmit the speech data to the first intelligent server 200 supporting the first speech-based intelligent agent.

The first intelligent server 200 according to an embodiment may include a communication circuit, a memory, and/or a processor. The first intelligent server 200 may further include the whole or a part of the configuration included in the intelligent server 200 of FIG. 1. Respective platforms included in the first intelligent server 200 may operate under the control of the processor of the first intelligent server 200.

According to an embodiment, the first intelligent server 200 may process the received speech data to generate the text data. For example, the first intelligent server 200 may process the speech data received from the user terminal 100 to generate the text data through an automatic speech recognition (ASR) module (e.g., automatic speech recognition module 221). For example, the automatic speech recognition module may include an utterance recognition module. The utterance recognition module may include an acoustic model and a language model. For example, the acoustic model may include utterance-related information, and the language model may include unit phoneme information and information on a combination of the unit phoneme information. The utterance recognition module may convert the user's utterance into the text data using the utterance-related information and the unit phoneme information. The information on the acoustic model and the language model may be stored in an automatic speech recognition database (ASR DB).

According to an embodiment, the first intelligent server 200 may determine a user's intent and an operation corresponding to the user's intent by analyzing the text data. For example, the first intelligent server 200 may process the text data through a natural language understanding module (e.g., natural language understanding module 223 of FIG. 1). The natural language understanding module may determine a domain and an intent of the user's speech command, and parameters required to grasp the intent by analyzing the processed text data. For example, one domain (e.g., A café) may include a plurality of intents (e.g., coffee order and coffee order cancel), and one intent may include a plurality of parameters (e.g., ice Americano and café latte).

According to an embodiment, the first intelligent server 200 may determine the domain by processing the text data. The domain may refer, for example, to an application or a capsule that should process the input user's speech command. The domain may refer, for example, to a device that should process the input user's speech command.

According to an embodiment, the first intelligent server 200 may identify a device intended to be controlled by a user by analyzing the text data. The first intelligent server 200 may process the text data enough to determine the domain through, for example, the natural language understanding module. The first intelligent server 200 may determine the domain by processing the text data, and may identify the device intended to be controlled by the user based on the determined domain. According to an embodiment, the first intelligent server 200 may identify the device intended to be controlled through classification of domains of the received speech data. For example, with reference to FIG. 5, the first intelligent server 200 may identify that the device intended to be controlled by the user is the electronic device 40. It is assumed by way of non-limiting example that the user's speech command is "Turn on the TV." In this case, the first intelligent server 200 may process the text data corresponding to the user's speech command, and may determine that the domain of the user's speech command is the "TV." Accordingly, the first intelligent server 200 may identify that the device intended to be controlled by the user is the "TV." The first intelligent server 200 may identify the device intended to be controlled even if it does not perform a complete natural language understanding process (determination of the user's intent and parameters).

According to an embodiment, the first intelligent server 200 may receive information on the intelligent agent supported by the identified device from an Internet of things (IoT) server 500. For example, the IoT server 500 may store device information of at least one electronic device registered in a user's account, information on intelligent agents supported by the at least one device, and user information. For example, the IoT server 500 may store device information of electronic devices stored in the user's account and information on intelligent agents supported by the electronic devices. For example, with reference to FIG. 5, the first intelligent server 200 may identify that the electronic device 40 intended to be controlled by the user supports the second speech-based intelligent agent.

According to an embodiment, the first intelligent server 200 may request the information on the intelligent agent supported by the identified device from the IoT server 500, and may receive the information on the intelligent agent supported by the identified device. According to an embodiment, the first intelligent server 200 may pre-receive from the IoT server 500 and store the information on the at least one device registered in the user's account and the information on the intelligent agent supported by the at least one device, and may identify the information on the intelligent agent supported by the identified device based on the information.

According to an embodiment, the first intelligent server 200 may determine whether to transmit the user's speech data to the second intelligent server 600 supporting the second speech-based intelligent agent based on the information on the intelligent agent supported by the identified device.

For example, the first intelligent server 200 may determine that because the intelligent agent supported by the electronic device 40 is the second speech-based intelligent agent, the first intelligent server 200 is unable to directly control the electronic device 40, and the second intelligent server 600 can control the electronic device 40. In this case, the first intelligent server 200 may transmit the user's speech data to the second intelligent server 600 supporting the second speech-based intelligent agent. According to an embodiment, the first intelligent server 200 may transmit the text data obtained by processing the user's speech data to the second intelligent server 600. According to an embodiment, the second intelligent server 600 may control the electronic device 40 to meet the user's intent by processing the received user's speech data.

For example, if the intelligent agent supported by the electronic device 40 is the first speech-based intelligent agent that is not the second speech-based intelligent agent, the first intelligent server 200 may determine that it can directly control the electronic device 40. In this case, the first intelligent server 200 may determine that it does not transmit the user's speech data to the second intelligent server 600. In this case, the first intelligent server 200 may determine up to the user's intent and the parameter in addition to the domain, by processing the text data. For example, the first intelligent server 200 may determine the user's intent by performing syntactic analysis or semantic analysis with respect to the text data through the natural language understanding module. The syntactic analysis may divide the text data in a syntactic unit (e.g., word, phrase, or morpheme), and may grasp what syntactic element the divided unit has. The semantic analysis may be performed using semantic matching, rule matching, or formula matching. The first intelligent server 200 may determine the domain for discriminating the service that matches the intent corresponding to the text data, the intent, and the parameter necessary to grasp the intent. The first intelligent server 200 may identify the user's intent determined through the natural language understanding and an operation suitable to the user's intent, and may identify the parameter necessary to execute the identified operation. The first intelligent server 200 may perform an operation corresponding to the user's intent based on the parameter. For example, the first intelligent server 200 may control the electronic device 40 to meet the user's intent.

Hereinafter, with reference to FIG. 5, example scenarios to control the electronic device 40 using the user terminal 100 will be described.

According to an example embodiment of the disclosure, the user terminal 100 supporting the first speech-based intelligent agent may receive a wakeup utterance to execute the first speech-based intelligent agent through a microphone. The user terminal 100 may receive a speech command "Show me the channel guide on the TV" from the user after the wakeup utterance is input.

According to an example embodiment, the user terminal 100 may process the received speech command to the speech data, and may transmit the speech data to the first intelligent server 200 supporting the first speech-based intelligent agent.

According to an example embodiment, the first intelligent server 200 may process the received speech data to generate the text data.

According to an example embodiment, the first intelligent server 200 may identify that the device intended to be controlled by the user is "TV" by analyzing the text data. For example, the first intelligent server may determine the domain as the "TV" by processing the text data, and may identify that the device intended to be controlled is the "TV" based on the determined domain.

According to an example embodiment, the first intelligent server 200 may receive the information (e.g., device information) on the "TV" and the information on the intelligent agent supported by the "TV" from the IoT server 500. For example, the first intelligent server 200 may receive the information notifying that the "TV" supports the second speech-based intelligent agent from the IoT server 500.

According to an example embodiment, the first intelligent server 200 may determine to transmit the user's speech data to the second intelligent server 600 supporting the second speech-based intelligent agent in response to a case where the "TV" supports the second speech-based intelligent agent. For example, the first intelligent server 200 may transmit the user's speech data to the second intelligent server 600. According to an embodiment, the first intelligent server 200 may transmit the processed text data to the second intelligent server 600.

According to an example embodiment, the second intelligent server 600 may determine the user's intent and the operation corresponding to the intent by processing the user's speech data, and may transmit a control command to show the channel guide to the electronic device 40 so that the operation can be performed by the electronic device 40 corresponding to the "TV." For example, the second intelligent server 600 may transmit the control command to show the channel guide to the electronic device 40 through a deep link.

According to an example embodiment, the electronic device 40 may display the channel guide based on the received control command.

Figure 6:
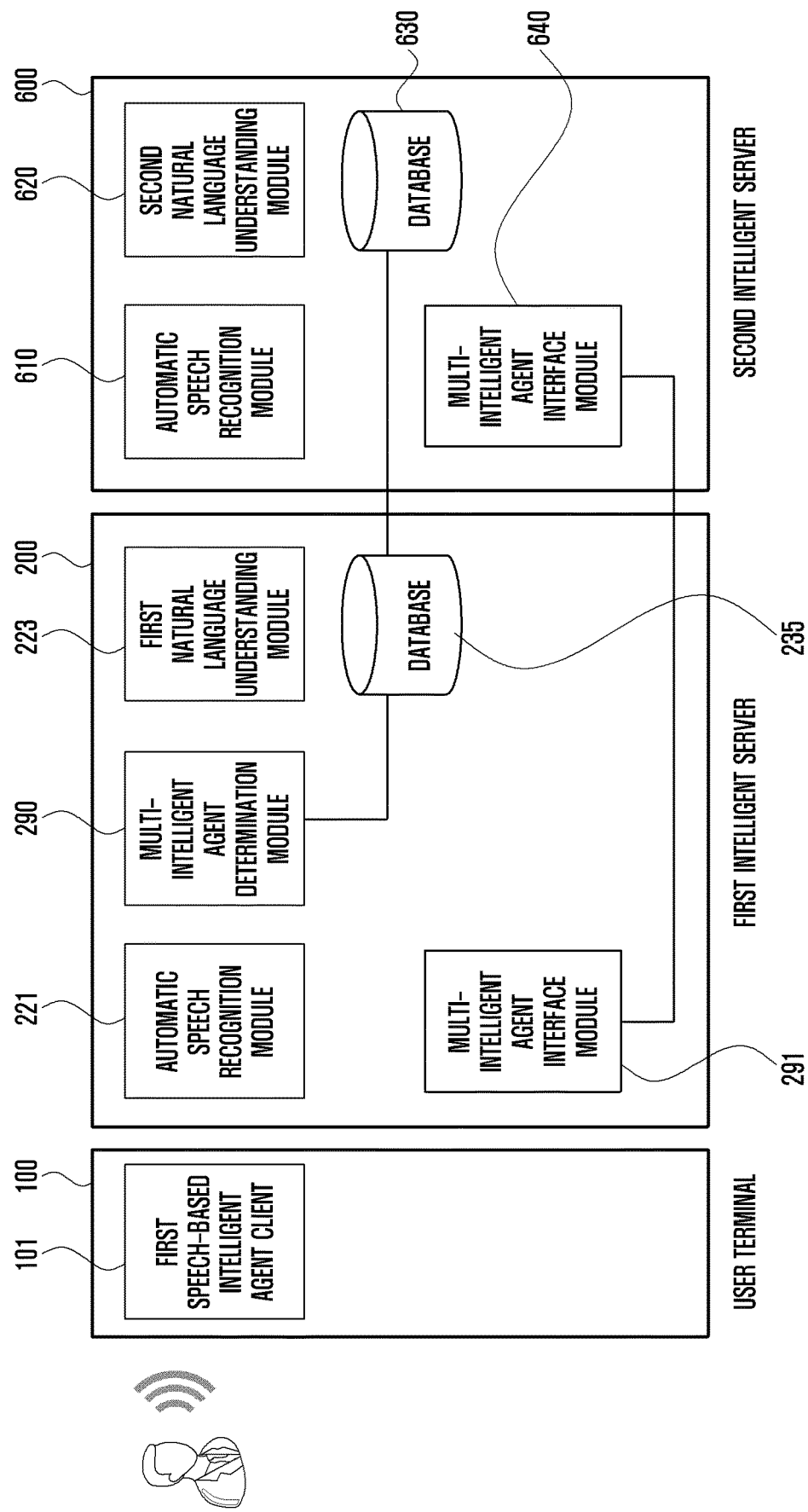
FIG. 6 is a block diagram illustrating an example operating environment among a user terminal, a first intelligent server, and a second intelligent server according to an embodiment.

FIG. 6 is a block diagram illustrating an example operating environment among a user terminal, a first intelligent server, and a second intelligent server according to an embodiment.

With reference to FIG. 6, a user terminal 100 according to an embodiment of the disclosure may receive a user's wakeup utterance to execute a first speech-based intelligent client 101 through a microphone. In response to the reception of the wakeup utterance, a first speech-based intelligent agent may be called. After the first speech-based intelligent agent is called, the user terminal 100 may receive a speech command from a user. The user terminal 100 may process the received speech command to speech data. The user terminal 100 may transmit the speech data to a first intelligent server 200 supporting a first speech-based intelligent agent.

A database 235 according to an embodiment may match and store information on at least one device registered in a user's account and information on the intelligent agent supported by the at least one device.

The first intelligent server 200 according to an embodiment may include an automatic speech recognition module (e.g., including processing circuitry and/or executable program elements) 221, a multi-intelligent agent determination module (e.g., including processing circuitry and/or executable program elements) 290, a multi-intelligent agent interface module (e.g., including processing circuitry and/or executable program elements) 291, a first natural language understanding module (e.g., including processing circuitry and/or executable program elements) 223, and a database 235. The automatic speech recognition module 221, the multi-intelligent agent determination module 290, the multi-intelligent agent interface module 291, and the first natural language understanding module 223 may be software modules stored in a memory (not illustrated) of the first intelligent server 200, and may operate under the control of a processor. According to various embodiments, the memory may store various instructions for an operation of the processor of the first intelligent server 200. The first intelligent server 200 may further include the whole or a part of the configuration included in the intelligent server 200 of FIG. 1. Description of the contents that overlap the content as described above with reference to FIG. 5 will be omitted. According to an embodiment, the automatic speech recognition module 221 of the first intelligent server 200 may process the user's speech data to generate text data. The automatic speech recognition module 221 may transmit the processed text data to the multi-intelligent agent determination module 290.

The multi-intelligent agent determination module 290 according to an embodiment may be a module which determines whether the user's speech data can be processed by the first speech-based intelligent agent through processing of the text data. The multi-intelligent agent determination module 290 may identify, for example, a device intended to be controlled by the user by processing the text data. The multi-intelligent agent determination module 290 may identify information on the identified device and information on the intelligent agent supported by the identified device from the database 235. For example, the multi-intelligent agent determination module 290 according to an embodiment may be a module that performs only an operation to determine a domain among natural language understanding processing operations being processed through the natural language understanding module. The domain may refer, for example, to an application or a capsule that should process the input user's speech command, or a device that should process the input user's speech command. The multi-intelligent agent determination module 290 may determine whether to transmit the user's speech data to a second intelligent server 600 supporting a second speech-based intelligent agent based on, for example, information on the intelligent agent supported by the identified device. According to an embodiment, the multi-intelligent agent determination module 290 may be, for example, a module that identifies the device intended to be controlled by the user.

For example, if the identified device supports the first speech-based intelligent agent, the multi-intelligent agent determination module 290 may determine not to transmit the user's speech data to the second intelligent server 600, and may determine that the first intelligent server 200 processes the user's speech data. The multi-intelligent agent determination module 290 may transmit the text data to the first natural language understanding module 223. The first natural language understanding module 223 may determine the operation corresponding to the user's intention based on a determined parameter. The first intelligent server 200 may transmit a control command for making the identified device perform the determined operation to the identified device.

For example, if the identified device supports the second speech-based intelligent agent, the multi-intelligent agent determination module 290 may determine to transmit the user's speech data to the second intelligent server 600. In this case, the processor of the first intelligent server 200 may transmit the user's speech data to the second intelligent server 600. According to an embodiment, the processor of the first intelligent server 200 may transmit the processed text data to the second intelligent server 600.

The second intelligent server 600 according to an embodiment may process the user's speech data received from the first intelligent server 200 to generate the text data through the automatic speech recognition module 610. If the text data is received from the first intelligent server 200, the above-described operation may be omitted. The second intelligent server 600 according to an embodiment may determine the user's intent and the parameter corresponding to the intent by processing the text data through the second natural language understanding module 620, and may determine the operation corresponding to the user's intent based on the parameter. According to an embodiment, the second intelligent server 600 may transmit the control command for making the identified device perform the determined operation to the identified device.

According to an embodiment, the first intelligent server 200 may transmit and receive various messages with the second intelligent server 600 through the multi-intelligent agent interface module 291. According to an embodiment, the first intelligent server 200 may receive a message including an additional question from the second intelligent server 600. In this case, the first intelligent server 200 may transmit the message including the additional question to the user terminal, and may receive a response message to the additional question from the user terminal 100.

Figure 7:
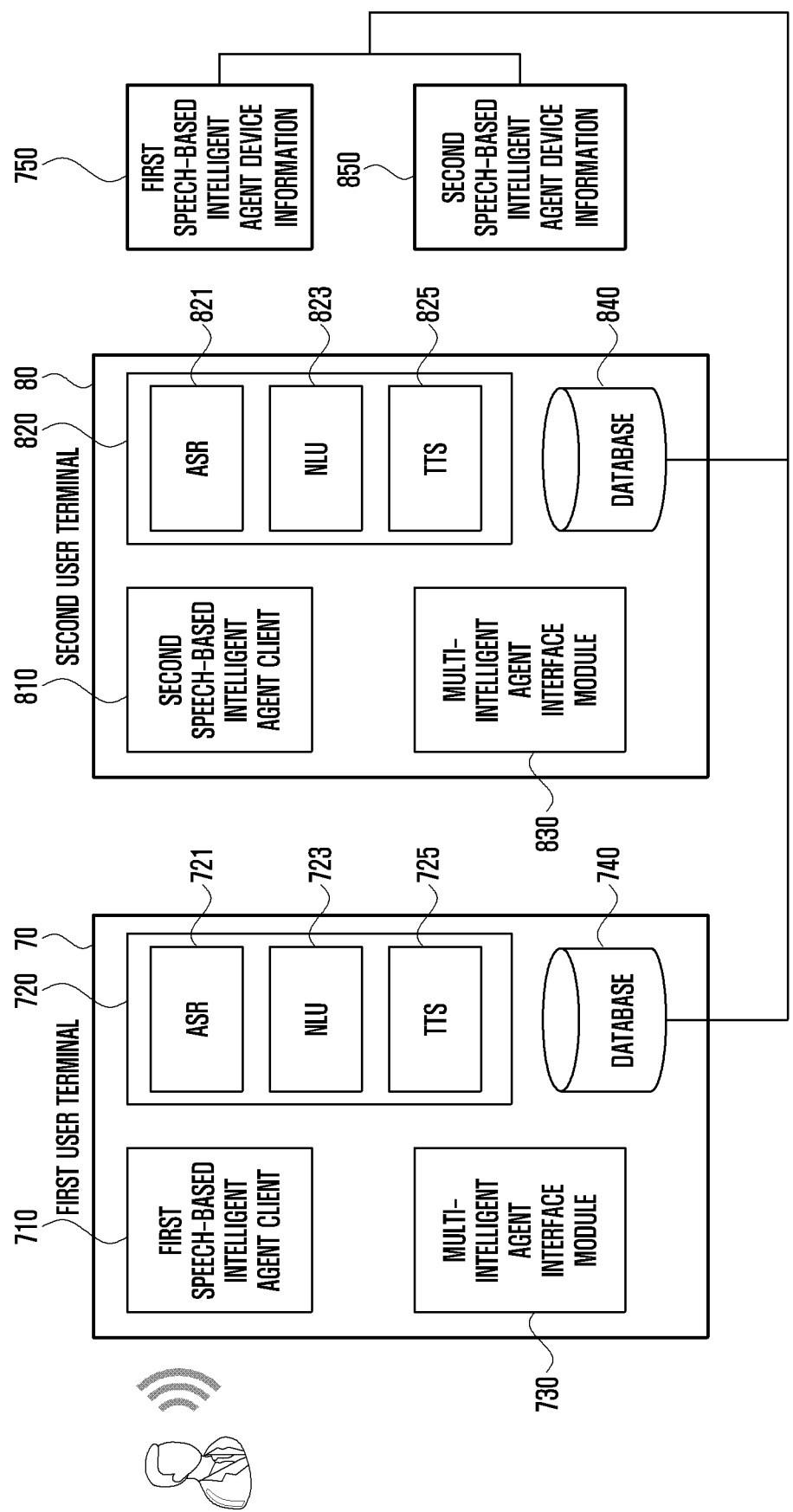
FIG. 7 is a block diagram illustrating an example operating environment between a first user terminal and a second user terminal according to an embodiment.

FIG. 7 is a block diagram illustrating an example operating environment between a first user terminal and a second user terminal according to an embodiment.

With reference to FIG. 7, it is assumed that a first user terminal 70 supports a first speech-based intelligent agent, and a second user terminal 80 supports a second speech-based intelligent agent. Description of the contents that overlap the contents as described above with reference to FIGS. 5 and 6 will be omitted.

The first user terminal 70 according to an embodiment may include a first speech-based intelligent agent client 710, a natural language platform (e.g., including processing circuitry and/or executable program elements) 720, a multi-intelligent agent interface module (e.g., including processing circuitry and/or executable program elements) 730, a database 740 (e.g., memory 150 of FIG. 1), a microphone (not illustrated) (e.g., microphone 120 of FIG. 1), a display (not illustrated) (e.g., display 140 of FIG. 1), a speaker (not illustrated) (e.g., speaker 130 of FIG. 1), a communication circuit (not illustrated) (e.g., communication interface 110 of FIG. 1), a memory (not illustrated) (e.g., memory 150 of FIG. 1), or a processor (not illustrated) (e.g., processor 160 of FIG. 1). The natural language platform 720 may include, for example, an automatic speech recognition module (ASR)

(e.g., including processing circuitry and/or executable program elements) 721, a natural language understanding module (NLU) (e.g., including processing circuitry and/or executable program elements) 723, and a text-to-speech module (TTS) (e.g., including processing circuitry and/or executable program elements) 725.

The second user terminal 80 according to an embodiment may include a second speech-based intelligent agent client 810, a natural language platform (e.g., including processing circuitry and/or executable program elements) 820, a multi-intelligent agent interface module (e.g., including processing circuitry and/or executable program elements) 830, a database 840, a communication circuit (not illustrated), or a processor (not illustrated). The natural language platform 820 may include, for example, an automatic speech recognition module (ASR) (e.g., including processing circuitry and/or executable program elements) 821, a natural language understanding module (NLU) (e.g., including processing circuitry and/or executable program elements) 823, and a text-to-speech module (TTS) (e.g., including processing circuitry and/or executable program elements) 825. The natural language understanding module 723 of the first user terminal 70 and the natural language understanding module 823 of the second user terminal 80 may be different natural language understanding modules from each other.

According to an embodiment, the database 740 of the first user terminal 70 and the database 840 of the second user terminal 80 may store device information 750 registered in the first speech-based intelligent agent and device information 850 registered in the second speech-based intelligent agent in all. For example, the first user terminal 70 and the second user terminal 80 may integrally store information on at least one device registered in the first speech-based intelligent agent and information on at least one device registered in the second speech-based intelligent agent.

According to an embodiment, the first user terminal 70 may receive the user's speech data through the microphone.

According to an embodiment, the first user terminal 70 may process the received speech data to generate text data.

According to an embodiment, the first user terminal 70 may identify the device intended to be controlled by the user by analyzing the text data.

According to an embodiment, the first user terminal 70 may identify information on at least one device registered in a pre-stored user's account and information on an intelligent agent supported by the at least one device. According to an embodiment, the first user terminal 70 may determine whether to transmit the user's speech data to the second user terminal 80 supporting the second speech-based intelligent agent based on the information on the intelligent agent supported by the identified device.

For example, if the identified device supports the second speech-based intelligent agent, the first user terminal 70 may transmit the user's speech data to the second user terminal 80 through the communication circuit. For example, if the identified device supports the first speech-based intelligent agent, the first user terminal 70 may process the text data through the natural language platform 720.

According to an embodiment, the device information 750 registered in the first speech-based intelligent agent and the device information 850 registered in the second speech-based intelligent agent may include, for example, information on names of the registered devices (e.g., registered names) and intelligent agents supported by the registered devices. In this case, even if the name of the same device registered in the first speech-based intelligent agent is different from the name registered in the second speech-based intelligent agent, the device name may be changed based on the stored information. For example, even if a speech command "Turn on the big TV" is received in the first user terminal 70 in a state where one electronic device is registered as the "main-room TV" in the first speech-based intelligent agent while it is registered as the "big TV" in the second speech-based intelligent agent, the first user terminal 70 may identify that the device intended to be controlled by the user is the "main-room TV." According to an embodiment, the first user terminal 70 and the second user terminal 80 can accurately identify the device intended to be controlled by the user even if anyone of the registered device names of the same device is input from the user.

According to an embodiment, the first user terminal 70 and the second user terminal 80 may transmit and receive various messages with each other through the multi-intelligent agent interface modules 730 and 830. According to an embodiment, the first user terminal 70 may receive a message including an additional question from the second user terminal 80.

Figure 8:
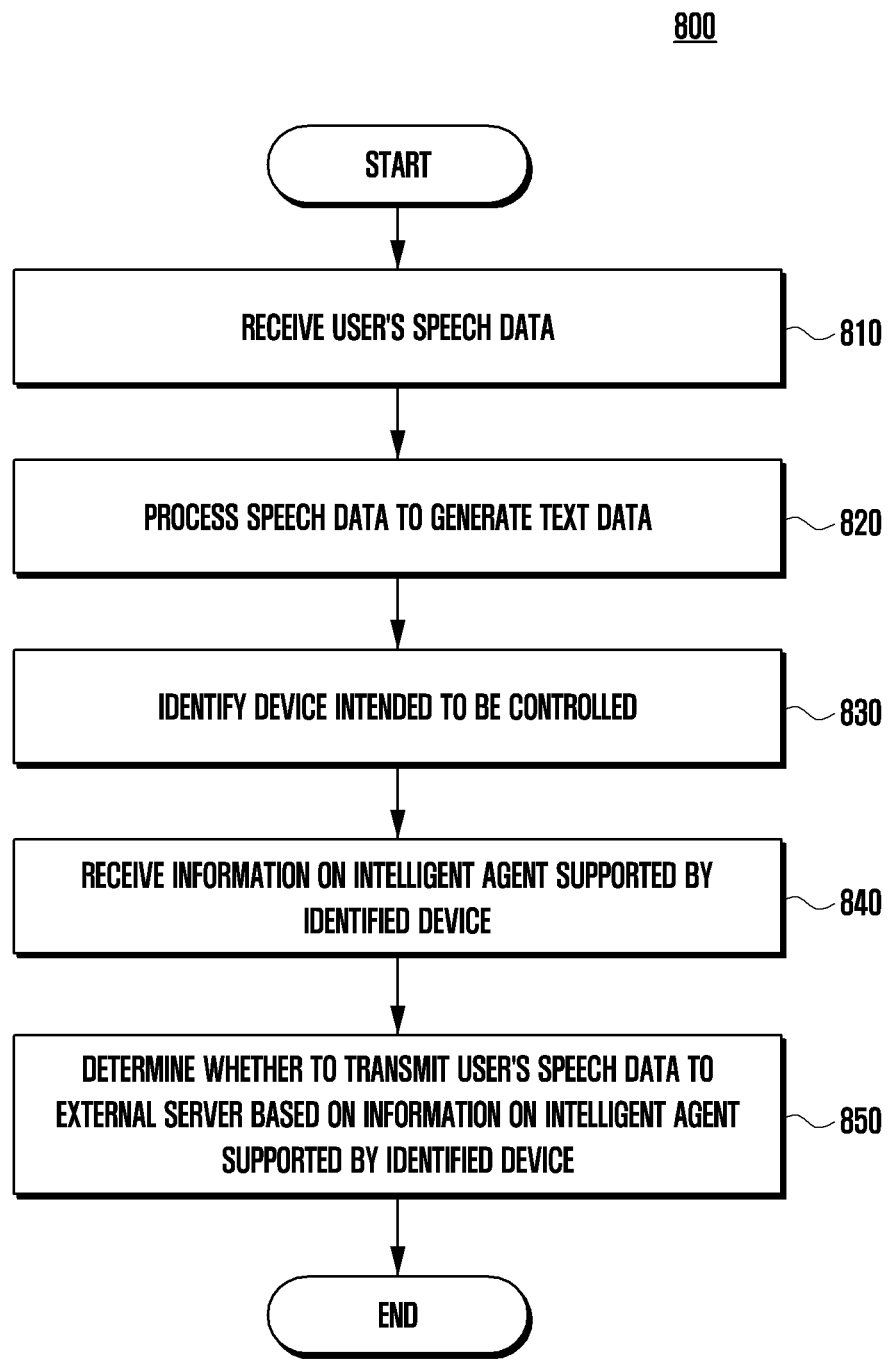
FIG. 8 is a flowchart illustrating an example operation of a first intelligent server according to an embodiment.

FIG. 8 is a flowchart illustrating example operations of a first intelligent server (e.g., first intelligent server 200 of FIG. 5) according to an embodiment. In FIG. 8, the first intelligent server is described as an electronic device.

With reference to the flowchart 800, a processor of an electronic device according to an embodiment, at operation 810, may receive user's speech data from a user terminal (e.g., user terminal 100 of FIG. 5). The electronic device may be a server supporting a first speech-based intelligent agent (e.g., first intelligent server 200 of FIG. 5).

At operation 820, the processor of the electronic device according to an embodiment may process speech data to generate text data.

At operation 830, the processor of the electronic device according to an embodiment may identify a device intended to be controlled by a user by analyzing the text data.

At operation 840, the processor of the electronic device according to an embodiment may receive information on an intelligent agent supported by the identified device. For example, the processor may receive information on the intelligent agent supported by the identified device from a first external server (e.g., IoT server 500 of FIG. 5). For example, the first external server may store device information of at least one electronic device registered in a user's account, information on the intelligent agent supported by the at least one device, and user information.

At operation 850, the processor of the electronic device according to an embodiment may determine whether to transmit the user's speech data to an external server (e.g., second intelligent server 600 of FIG. 5) based on the information on the intelligent agent supported by the identified device. For example, the external server may be a server supporting the second speech-based intelligent agent. For example, if the identified device supports the first speech-based intelligent agent, the processor may determine not to transmit the user's speech data to the external server. For example, if the identified device supports the second speech-based intelligent agent, the processor may determine to transmit the user's speech data to the external server.

Figure 9:
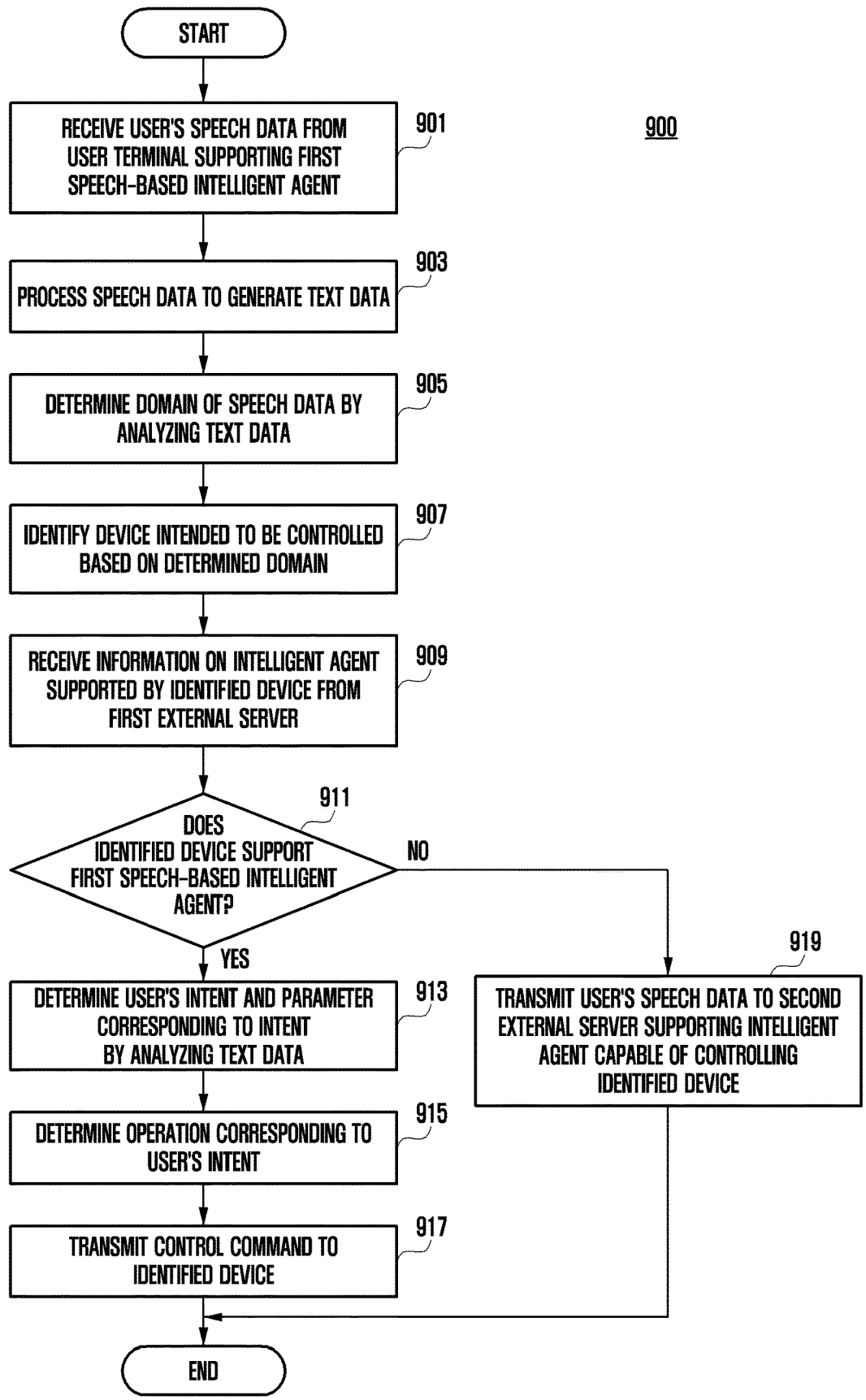
FIG. 9 is a flowchart illustrating an example operation of a first intelligent server according to an embodiment.

FIG. 9 is a flowchart illustrating example operations of a first intelligent server (e.g., first intelligent server 200 of FIG. 5) according to an embodiment. In FIG. 9, the first intelligent server is described as an electronic device.

With reference to the operation flowchart 900, a processor of an electronic device according to an embodiment, at operation 901, may receive user's speech data from a user terminal (e.g., user terminal 100 of FIG. 5) supporting a first speech-based intelligent agent. The electronic device may be, for example, a server supporting the first speech-based intelligent agent.

At operation 903, the processor of the electronic device according to an embodiment may process received speech data to generate text data.

At operation 905, the processor of the electronic device according to an embodiment may determine a domain of the speech data by analyzing the text data.

At operation 907, the processor of the electronic device according to an embodiment may identify a device intended to be controlled by a user based on the determined domain.

At operation 909, the processor of the electronic device according to an embodiment may receive information on an intelligent agent supported by the identified device from a first external server (e.g., IoT server 500 of FIG. 5). For example, the first external server may store device information of at least one electronic device registered in a user's account, information on the intelligent agent supported by the at least one device, and user information.

At operation 911, the processor of the electronic device according to an embodiment may identify whether the identified device supports the first speech-based intelligent agent based on the received information.

If it is identified that the identified device does not support the first speech-based intelligent agent, the operation branches to operation 919 (911-NO), and the processor of the electronic device may transmit the user's speech data to a second external server (e.g., second intelligent server 600 of FIG. 5) supporting the intelligent agent capable of controlling the identified device. For example, if the identified device supports a second speech-based intelligent agent, the processor of the electronic device may transmit the user's speech data to the second external server supporting the second speech-based intelligent agent.

If it is identified that the identified device supports the first speech-based intelligent agent, the operation branches to operation 913 (911—YES), and the processor of the electronic device may determine a user's intent and a parameter corresponding to the intent by analyzing the text data.

At operation 915, the processor of the electronic device according to an embodiment may determine the operation corresponding to the user's intent based on the determined parameter.

At operation 917, the processor of the electronic device according to an embodiment may transmit a control command based on the determined operation to the identified device.

Figure 10:
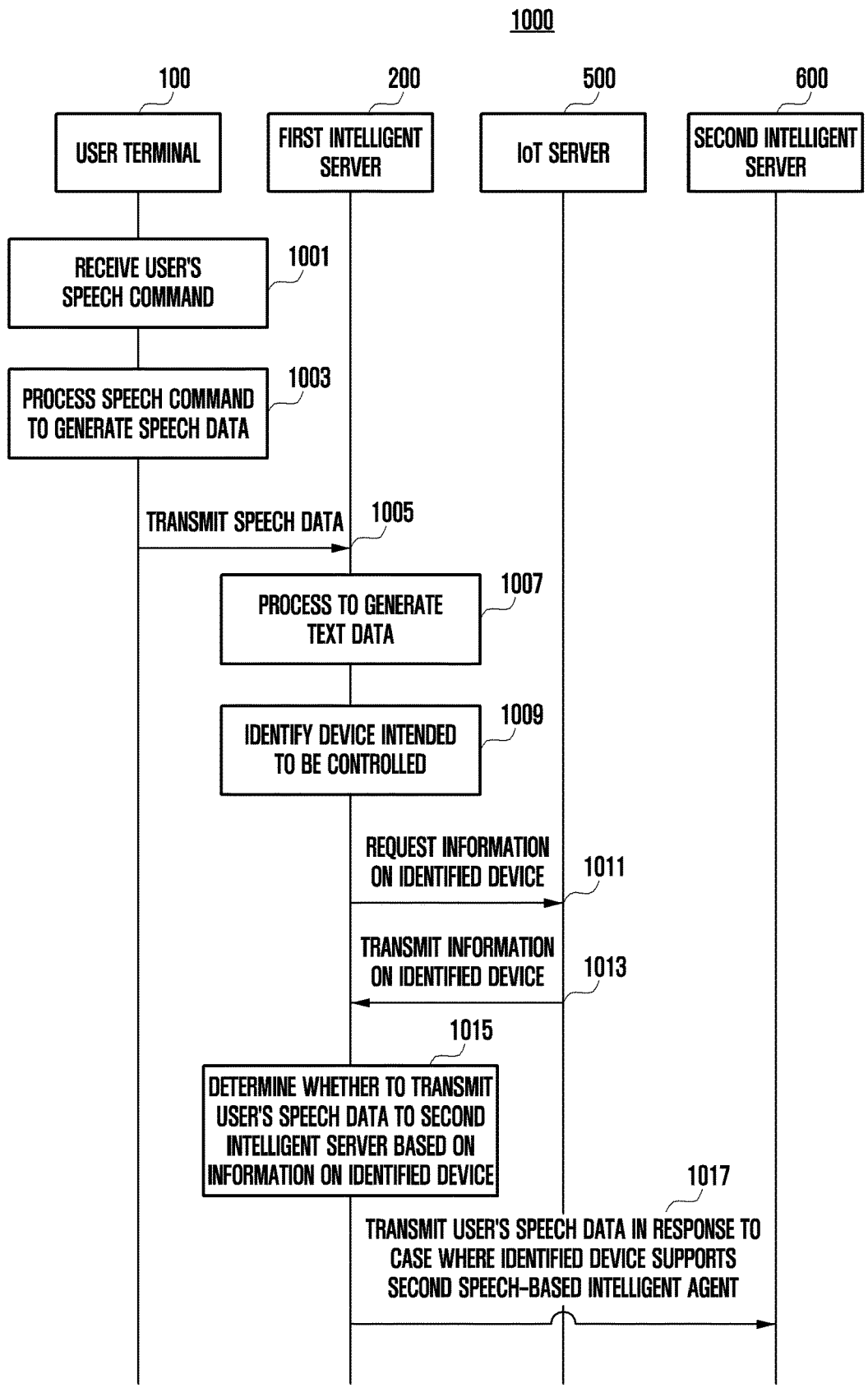
FIG. 10 is signal flow diagram illustrating example operations among a user terminal, a first intelligent server, an IoT server, and a second intelligent server according to an embodiment.

FIG. 10 is signal flow diagram illustrating example operations among a user terminal 100, a first intelligent server 200, an IoT server 500, and a second intelligent server 600 according to an embodiment. According to an embodiment, the user terminal 100 and the first intelligent server 200 may support a first speech-based intelligent agent, and the second intelligent server 600 may support a second speech-based intelligent agent.

With reference to the signal flow diagram 1000, the user terminal 100 according to an embodiment, at operation 1001, may receive a speech command from a user. For example, the user terminal 100 may receive a user's utterance through a microphone.

At operation 1003, the user terminal 100 according to an embodiment may process the received speech command to generate speech data.

At operation 1005, the user terminal 100 according to an embodiment may transmit the speech data to the first intelligent server 200.

At operation 1007, the first intelligent server 200 according to an embodiment may process the received speech data to generate text data.

At operation 1009, the first intelligent server 200 according to an embodiment may identify a device intended to be controlled by a user by analyzing the text data.

At operation 1011, the first intelligent server 200 according to an embodiment may request information on the identified device from the IoT server 500. The information on the identified device may include, for example, information on an intelligent agent supported by the identified device.

At operation 1013, the first intelligent server 200 according to an embodiment may receive the information on the identified device transmitted from the IoT server 500.

At operation 1015, the first intelligent server 200 according to an embodiment may determine whether to transmit the user's speech data to a second external server supporting a second speech-based intelligent agent based on the information on the identified device. For example, the first intelligent server 200 may determine whether to transmit the user's speech data to a second external server supporting a second speech-based intelligent agent based on information on the intelligent agent supported by the identified device.

For example, if the identified device supports the first speech-based intelligent agent, the first intelligent server 200 may determine not to transmit the user's speech data to the second intelligent server 600, and may determine that the first intelligent server 200 processes the user's speech data.

For example, if the identified device supports the second speech-based intelligent agent, the first intelligent server 200 may determine to transmit the user's speech data to the second intelligent server 600.

At operation 1017, the first intelligent server 200 according to an embodiment may transmit the user's speech data to the second intelligent server 600 in response to a case where the identified device supports the second speech-based intelligent agent.

Figure 11:
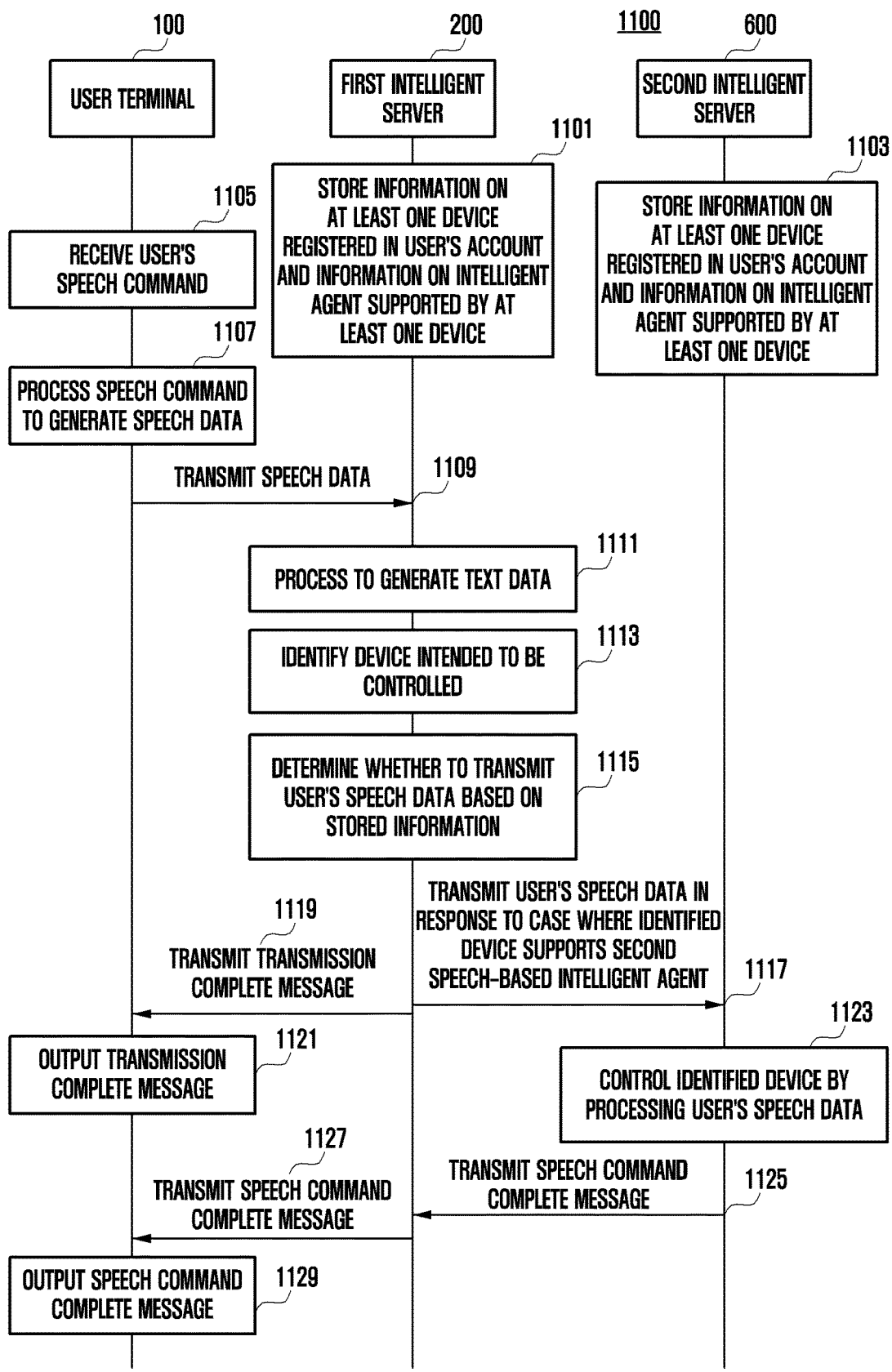
FIG. 11 is signal flow diagram illustrating example operations among a user terminal, a first intelligent server, and a second intelligent server according to an embodiment.

FIG. 11 is signal flow diagram illustrating example operations among a user terminal 100, a first intelligent server 200, and a second intelligent server 600 according to an embodiment. According to an embodiment, the user terminal 100 and the first intelligent server 200 may support a first speech-based intelligent agent, and the second intelligent server 600 may support a second speech-based intelligent agent.

With reference to the signal flow diagram 1100, the first intelligent server 200 according to an embodiment, at operation 1101, may store information on at least one device registered in a user's account and information on an intelligent agent supported by the at least one device in a memory (e.g., database 235 of FIG. 6). At operation 1103, the second intelligent server 600 according to an embodiment may also store the information on the at least one device registered in the user's account and the information on the intelligent agent supported by the at least one device in a memory (e.g., database 630 of FIG. 6). For example, the first intelligent server 200 may integrally store not only device information registered in the first speech-based intelligent agent but also device information registered in the second speech-based intelligent agent. The information on the at least one device registered in the user's account may include, for example, names of the at least one device registered in the first speech-based intelligent agent and the second speech-based intelligent agent, respectively.

At operation 1105, the user terminal 100 according to an embodiment may receive a speech command from the user.

At operation 1107, the user terminal 100 according to an embodiment may process the received speech command to generate speech data.

At operation 1109, the user terminal 100 according to an embodiment may transmit the speech data to the first intelligent server 200.

At operation 1111, the user terminal 100 according to an embodiment may process the received speech data to generate text data.

At operation 1113, the first intelligent server 200 according to an embodiment may identify a device intended to be controlled by the user by analyzing the text data. For example, the first intelligent server 200 may determine a domain of the speech data by analyzing the text data, and may identify the device intended to be controlled by the user based on the determined domain.

At operation 1115, the first intelligent server 200 according to an embodiment may determine whether to transmit the user's speech data to the second intelligent server 600. For example, the first intelligent server 200 may identify information on the intelligent agent supported by the identified device based on the information on the at least one device registered in the user's account and the information on the intelligent agent supported by the at least one device, which are stored in the memory. The first intelligent server 200 may determine whether to transmit the user's speech data to the second intelligent server 600 supporting the second speech-based intelligent agent based on the identified information.

At operation 1117, the first intelligent server 200 according to an embodiment may transmit the user's speech data to the second intelligent server 600 in response to a case where the identified device supports the second speech-based intelligent agent.

At operation 1119, the first intelligent server 200 according to an embodiment may transmit a transmission complete message including information on that the speech data has been completely transmitted to the second intelligent server 600 to the user terminal 100.

At operation 1121, the user terminal 100 according to an embodiment may output a message notifying of completion of the transmission of the user's speech command to the second speech-based intelligent agent in response to the reception of the transmission complete message. For example, the user terminal 100 may output the transmission complete message as a sound through a speaker. For example, the user terminal 100 may display the transmission complete message through a display.

At operation 1123, the second intelligent server 600 according to an embodiment may control the identified device by processing the user's speech data in response to the reception of the user's speech data from the first intelligent server 200. For example, the second intelligent server 600 may determine the user's intent and the operation corresponding to the user's intent by processing the user's speech data, and may transmit a control command to the identified device based on the determined operation.

At operation 1125, the second intelligent server 600 according to an embodiment may transmit a speech command complete message including information on that the second speech-based intelligent agent has completed the speech command to the first intelligent server 200 in response to the control of the identified device.

At operation 1127, the first intelligent server 200 according to an embodiment may transmit the speech command complete message to the user terminal 100.

At operation 1129, the user terminal 100 according to an embodiment may output a message notifying of completion of the speech command through the second speech-based intelligent agent in response to the reception of the speech command complete message. For example, the user terminal 100 may output the speech command complete message as a sound through the speaker. For example, the user terminal 100 may display the speech command complete message through the display.

Figure 12:
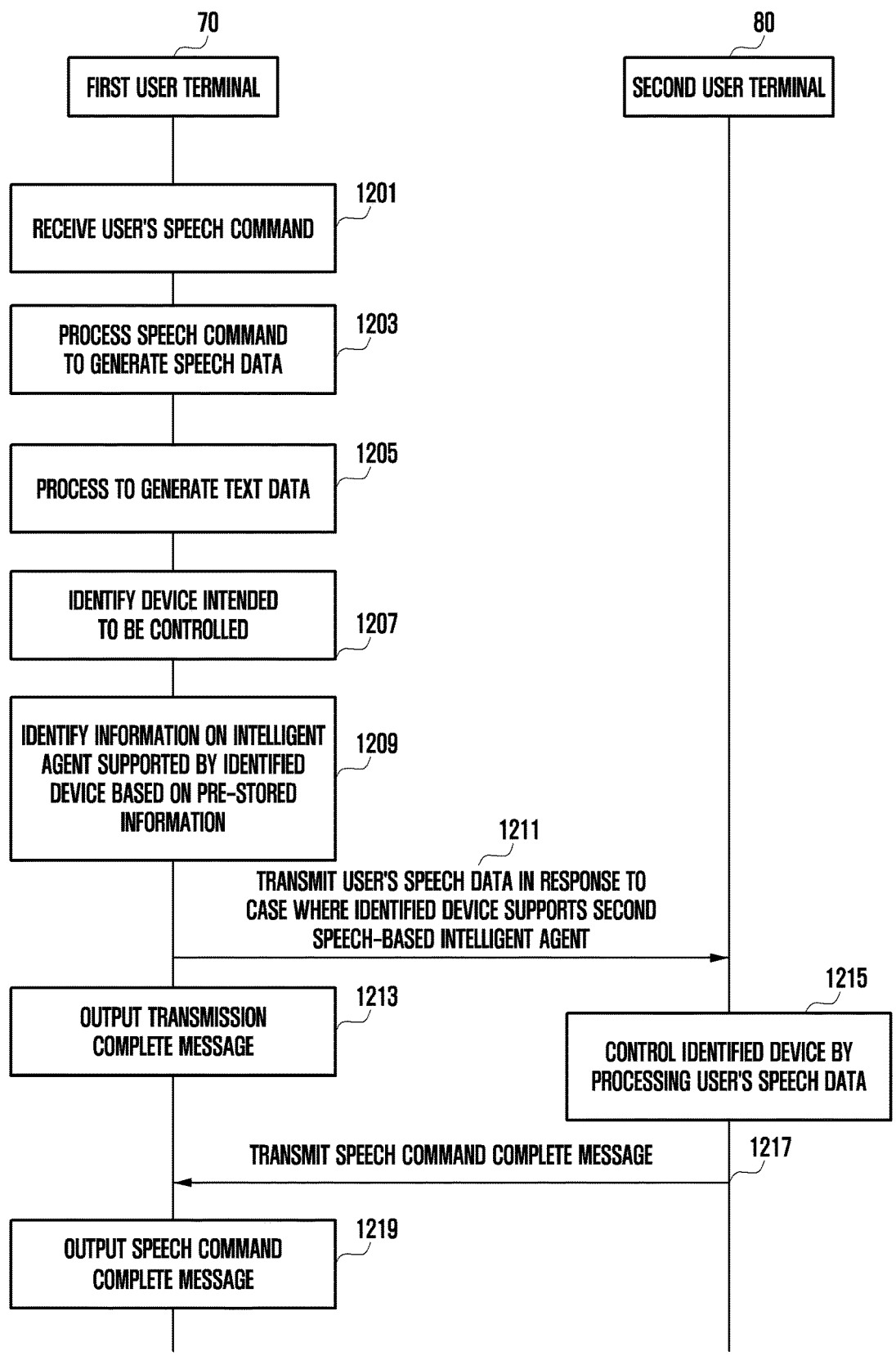
FIG. 12 is signal flow diagram illustrating example operations between a first user terminal and a second user terminal according to an embodiment.

FIG. 12 is signal flow diagram illustrating example operations between a first user terminal 70 and a second user terminal 80 according to an embodiment. According to an embodiment, the first user terminal 70 may store information on at least one device registered in a user's account and information on an intelligent agent supported by the at least one device in a memory (e.g., database 740 of FIG. 7).

With reference to FIG. 12, the first user terminal 70 according to an embodiment, at operation 1201, may receive a user's speech command.

At operation 1203, the first user terminal 70 according to an embodiment may process the received speech command to generate speech data.

At operation 1205, the first user terminal 70 according to an embodiment may process the speech data to generate text data.

At operation 1207, the first user terminal 70 according to an embodiment may identify a device intended to be controlled by a user by analyzing the text data.

At operation 1209, the first user terminal 70 according to an embodiment may identify information on an intelligent agent supported by the identified device based on pre-stored information.

At operation 1211, the first user terminal 70 according to an embodiment may transmit the user's speech data to the second user terminal 80 in response to a case where the identified device supports a second speech-based intelligent agent.

At operation 1213, the first user terminal 70 according to an embodiment may output a transmission complete message including information on that the user's speech data has been transmitted to the second user terminal 80 supporting the second speech-based intelligent agent. For example, the first user terminal 70 may output the transmission complete message as a sound through a speaker. For example, the first user terminal 70 may display the transmission complete message through a display.

At operation 1215, the second user terminal 80 according to an embodiment may control the identified device by processing the user's speech data in response to the reception of the user's speech data from the first user terminal 70. For example, the second user terminal 80 may determine the user's intent and the operation corresponding to the user's intent by processing the user's speech data, and may transmit a control command to the identified device based on the determined operation.

At operation 1217, the second user terminal 80 according to an embodiment may transmit a speech command complete message including information on that the second speech-based intelligent agent has completed the speech command to the first user terminal 70 in response to the control of the identified device.

At operation 1219, the first user terminal 70 according to an embodiment may output a message notifying of completion of the speech command through the second speech-based intelligent agent in response to the reception of the speech command complete message. For example, the first user terminal 70 may output the speech command complete message as a sound through the speaker. For example, the first user terminal 70 may display the speech command complete message through the display.

Figure 13:
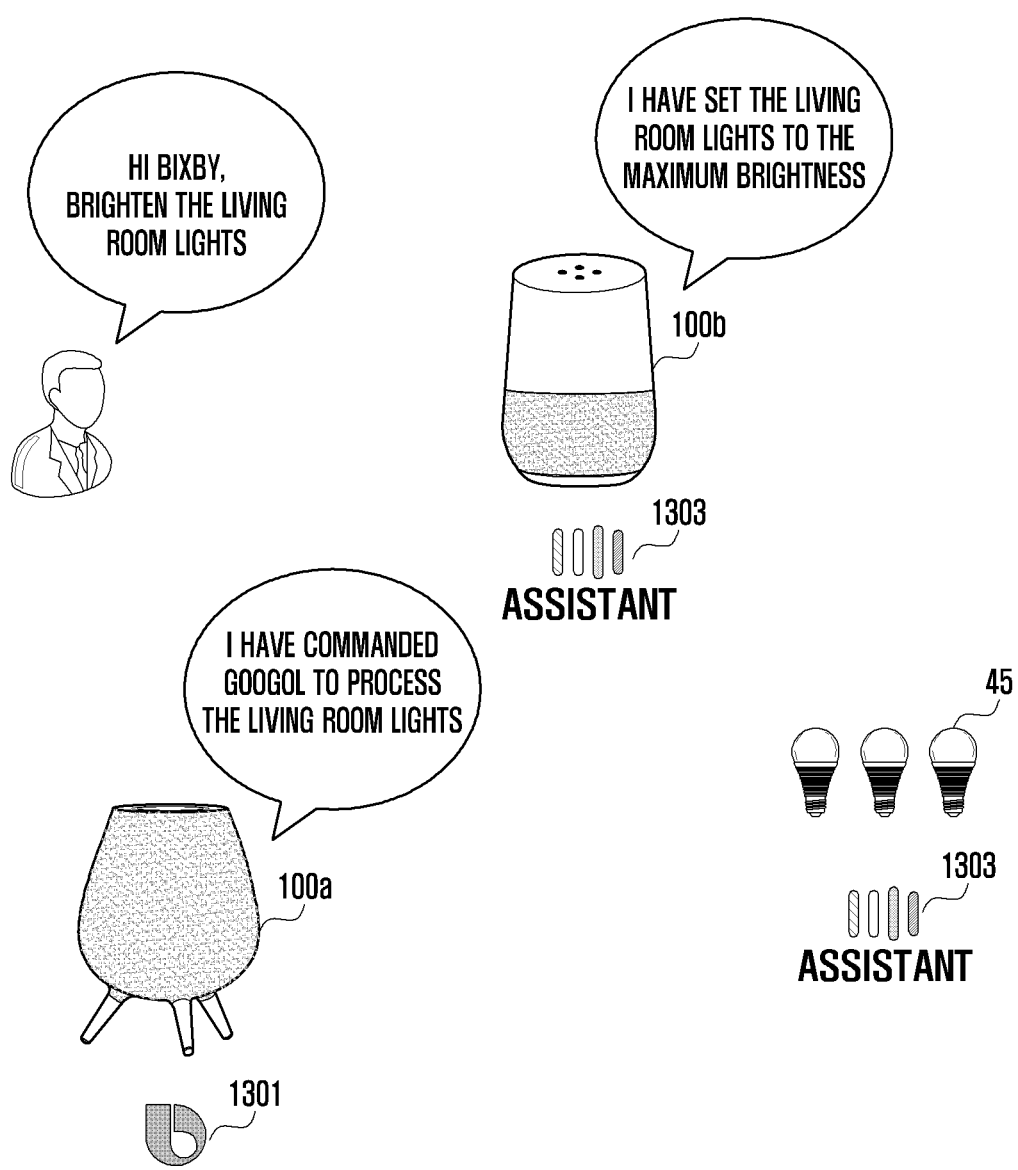
FIG. 13 is a diagram illustrating an example environment for controlling an electronic device supporting a second speech-based intelligent agent through a user terminal supporting a first speech-based intelligent agent according to an embodiment.

FIG. 13 is a diagram illustrating an example environment for controlling an electronic device 45 supporting a second speech-based intelligent agent 1303 through a user terminal 100*a* supporting a first speech-based intelligent agent 1301 according to an embodiment.

With reference to FIG. 13, it is assumed that the first user terminal 100*a* is a device supporting the first speech-based intelligent agent 1301, and the electronic device 45 is an electronic device supporting the second speech-based intelligent agent 1303.

According to an embodiment, a user may input a speech command "Hi Bixby, brighten the living room lights" to the first user terminal 100*a*. The "Hi Bixby" may be, for example, a wakeup utterance for calling the first speech-based intelligent agent 1301 client. The first speech-based intelligent agent 1301 may process the input user's speech command "Brighten the living room lights."

According to an embodiment, the first speech-based intelligent agent 1301 may identify that the device intended to be controlled by the user is the "living room lights." The first speech-based intelligent agent 1301 may identify that the intelligent agent supported by the "living room lights" is the second speech-based intelligent agent 1303. For example, the first speech-based intelligent agent 1301 may receive information on the intelligent agent supported by the "living room lights" from an external server (e.g., IoT server 500 of FIG. 5). For example, the first speech-based intelligent agent 1301 may pre-store the information on the intelligent agent supported by the "living room lights" in a database.

According to an embodiment, the first speech-based intelligent agent 1301 may transmit the user's speech command to the second speech-based intelligent agent 1303.

For example, the first user terminal 100*a* may transmit the user's speech data obtained by processing the user's speech command to the first intelligent server 200 supporting the first speech-based intelligent agent 1301. The first intelligent server 200 may identify the device intended to be controlled by the user by processing the user's speech data. The first intelligent server 200 may identify the information on the intelligent agent supported by the device intended to be controlled by the user, and may transmit the user's speech data to the second intelligent server 600 supporting the second speech-based intelligent agent 1303.

For example, the first user terminal 100*a* may identify the information on the intelligent agent supported by the device intended to be controlled by the user by processing the user's speech data, and may directly transmit the user's speech data to the second user terminal 100*b* supporting the second speech-based intelligent agent 1303 in response to a case where the device intended to be controlled by the user supports the second speech-based intelligent agent 1303.

According to an embodiment, the first user terminal 100*a* may output a message indicating that the first user terminal 100*a* has transmitted the user's speech command to the second speech-based intelligent agent 1303. For example, the first user terminal 100*a* may output a message "I have commanded Googol to process the living room lights" as a sound through a speaker. For example, Googol may be the name of the second speech-based intelligent agent 1303.

According to an embodiment, the second speech-based intelligent agent 1303 may process the received user's speech command. Through processing of the user's speech command, the second speech-based intelligent agent 1303 may identify that the device intended to be controlled by the user is the living room lights, may determine that the user's intent is to heighten the brightness of the living room lights, and may determine the parameter to set the brightness of the living room lights to the maximum brightness. The second speech-based intelligent agent 1303 may transmit the control command to set the living room lights to the maximum brightness to the electronic device 45 corresponding to the living room lights.

For example, the second intelligent server 600 may transmit the control command to perform the operation corresponding to the user's intent included in the user's speech data to the electronic device 45 intended to be controlled by the user by processing the received user's speech data. For example, the second intelligent server 600 may transmit the control command to set the electronic device 45 that is the device intended to be controlled by the user to the maximum brightness.

For example, the second user terminal 100*b* may transmit the control command to perform the operation corresponding to the user's intent included in the user's speech data to the electronic device 45 intended to be controlled by the user by directly processing the user's speech data. For example, the second user terminal 100*b* may transmit the control command to set the electronic device 45 that is the device intended to be controlled by the user to the maximum brightness to the electronic device 45.

According to an embodiment, the second user terminal 100*b* may output a message notifying of the completion of the received user's speech command. For example, the second user terminal 100*b* may output a message "I have set the living room lights to the maximum brightness" as a sound. According to an embodiment, the message notifying of the completion of the user's speech command may be transmitted to the first user terminal 100*a* through the second speech-based intelligent agent 1303, so that the first user terminal 100*a* may output the message.

For example, the second intelligent server 600 may control the second user terminal 100*b* to output a message indicating that the second user terminal 100*b* supporting the second speech-based intelligent agent 1303 has received and processed the user's speech command in response to the processing of the user's speech command "Brighten the living room lights." For example, the second user terminal 100*b* may output a message "I have set the living room lights to the maximum brightness" as a sound through the speaker.

For example, in the case where the second user terminal 100*b* directly processes the user's speech data, the second user terminal 100*b* may output a message indicating that the user's speech command has been transferred and processed in response to the processing of the user's speech command "Brighten the living room lights." For example, the second user terminal 100*b* may output the message "I have set the living room lights to the maximum brightness" as a sound through the speaker.

FIG. 14 is a diagram illustrating an example environment for controlling an electronic device 47 supporting a second speech-based intelligent agent 1305 through a user terminal 100*a* supporting a first speech-based intelligent agent 1301 according to an embodiment.

With reference to FIG. 14, it is assumed that the user terminal 100*a* is a device supporting the first speech-based intelligent agent 1301, and the electronic device 47 is an electronic device supporting the second speech-based intelligent agent 1305.

According to an embodiment, a user may input a speech command "Hi Bixby, turn on the air conditioner of the car" to the user terminal 100*a*. The "Hi Bixby" may be, for example, a wakeup utterance for calling the first speech-based intelligent agent 1301 client. The first speech-based intelligent agent 1301 may process the input user's speech command "Turn on the air conditioner of the car."

According to an embodiment, the first speech-based intelligent agent 1301 may identify that the device intended to be controlled by the user is the "car." The first speech-based intelligent agent 1301 may identify that the intelligent agent supported by the "car" is the second speech-based intelligent agent 1305. For example, the first speech-based intelligent agent 1301 may receive information on the intelligent agent supported by the "car" from an external server (e.g., IoT server 500 of FIG. 5). For example, the first speech-based intelligent agent 1301 may pre-store the information on the intelligent agent supported by the "car" in a database.

According to an embodiment, the first speech-based intelligent agent 1301 may transmit the user's speech command to the electronic device 47 supporting the second speech-based intelligent agent 1305. According to an embodiment, the user terminal 100*a* may output a message indicating that the user terminal 100*a* has transmitted the user's speech command to the electronic device 47 supporting the second speech-based intelligent agent 1305. For example, the user terminal 100*a* may output a message "I have transferred the command to the car" as a sound.

According to an embodiment, the second speech-based intelligent agent 1305 may process the received user's speech command. Through processing of the user's speech command, the second speech-based intelligent agent 1305 may identify that the device intended to be controlled by the user is the car, and may determine that the user's intent is to turn on the air conditioner of the car. The second speech-based intelligent agent 1305 may control the electronic device 47 corresponding to the car so as to turn on the air conditioner of the car.

According to an embodiment, the second speech-based intelligent agent 1305 may transmit a message notifying of the completion of the user's speech command to the user terminal 100*a*. According to an embodiment, the user terminal 100*a* may output the message notifying of the completion of the received user's speech command. For example, the user terminal 100*a* may output a message "the car has completed the command" as a sound.

Figure 15:
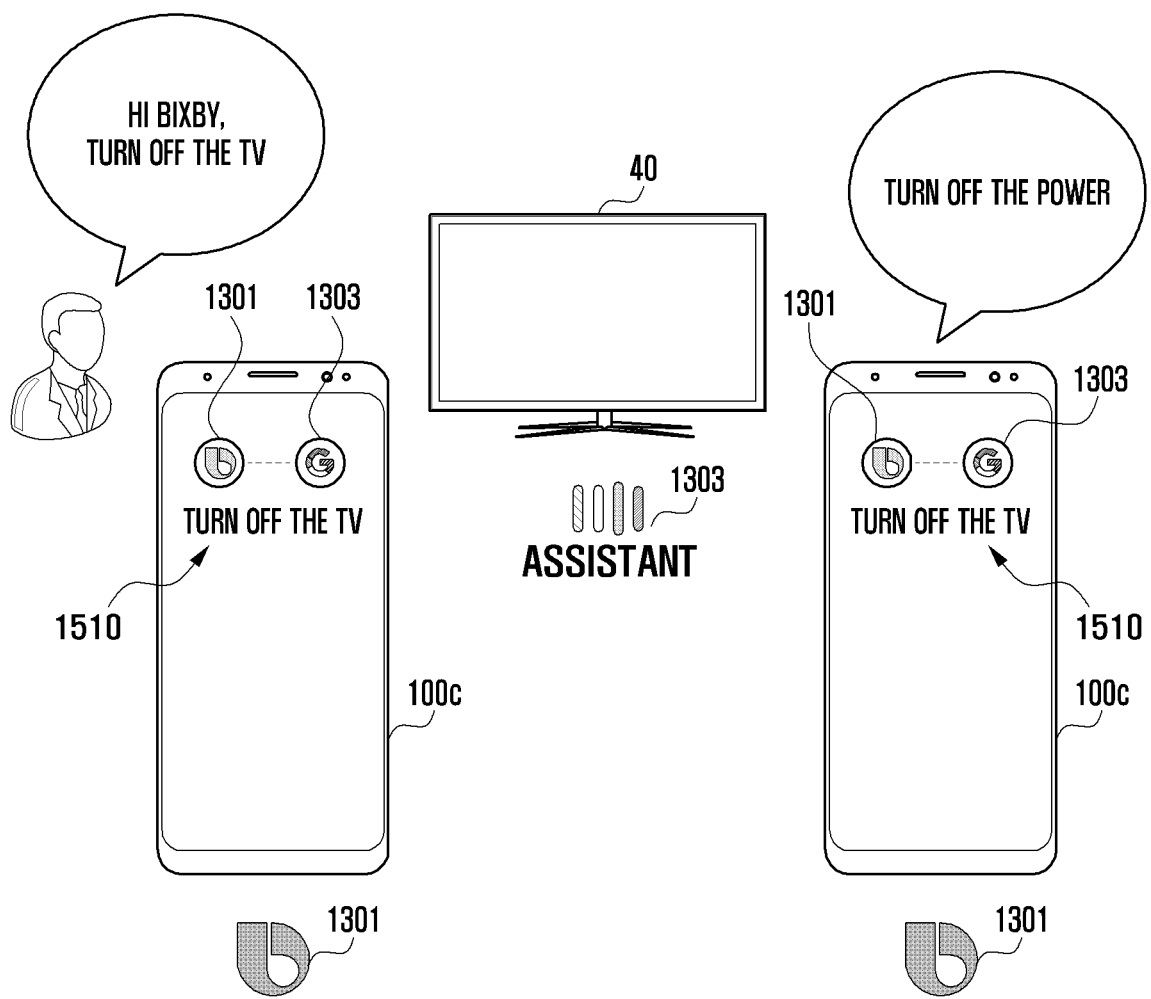
FIG. 15 is a diagram illustrating an example environment for controlling an electronic device supporting a second speech-based intelligent agent through a user terminal supporting a first speech-based intelligent agent according to an embodiment.

FIG. 15 is a diagram illustrating an example environment for controlling an electronic device 40 supporting a second speech-based intelligent agent 1303 through a user terminal 100*c* supporting a first speech-based intelligent agent 1301 according to an embodiment.

With reference to FIG. 15, it is assumed that the user terminal 100*c* is a device supporting the first speech-based intelligent agent 1301, and the electronic device 40 is an electronic device supporting the second speech-based intelligent agent 1303.

According to an embodiment, a user may input a speech command "Hi Bixby, turn off the TV" to the user terminal 100*c*. The "Hi Bixby" may be, for example, a wakeup utterance for calling the first speech-based intelligent agent 1301 client. The first speech-based intelligent agent 1301 may process the input user's speech command "Turn off the TV."

According to an embodiment, the first speech-based intelligent agent 1301 may identify that the device intended to be controlled by the user is the "TV." The first speech-based intelligent agent 1301 may identify that the intelligent agent supported by the "TV" is the second speech-based intelligent agent 1303.

According to an embodiment, the first speech-based intelligent agent 1301 may transmit the user's speech command to the second speech-based intelligent agent 1303. According to an embodiment, the user terminal 100*c* may output a message indicating that the user terminal 100*c* has transmitted the user's speech command to the second speech-based intelligent agent 1303 to a user interface (UI) 1510. For example, the user terminal 100*c* may display the intelligent agent having transferred the speech command as a logo, and may output the transferred speech command through the UI 1510.

According to an embodiment, the second speech-based intelligent agent 1303 may process the received user's speech command. Through processing of the user's speech command, the second speech-based intelligent agent 1303 may identify that the device intended to be controlled by the user is the TV, and may determine that the user's intent is to turn off the TV. The second speech-based intelligent agent 1303 may control the TV to turn off the power of the TV.

According to an embodiment, the second speech-based intelligent agent 1303 may transmit a message notifying of the completion of the user's speech command to the user terminal 100*c*. According to an embodiment, the user terminal 100*c* may output the message notifying that the second speech-based intelligent agent 1303 has completed the user's speech command through the UI. According to an embodiment, the user terminal 100*c* may output the second speech-based intelligent agent and the contents of the transmitted speech command through a display. According to an embodiment, the user terminal 100*c* may output a message notifying that the user's speech command has been completed by the second speech-based intelligent agent 1303 as a sound. For example, the user terminal 100*c* may output a message "Turn off the power" as a sound.

Figure 16:
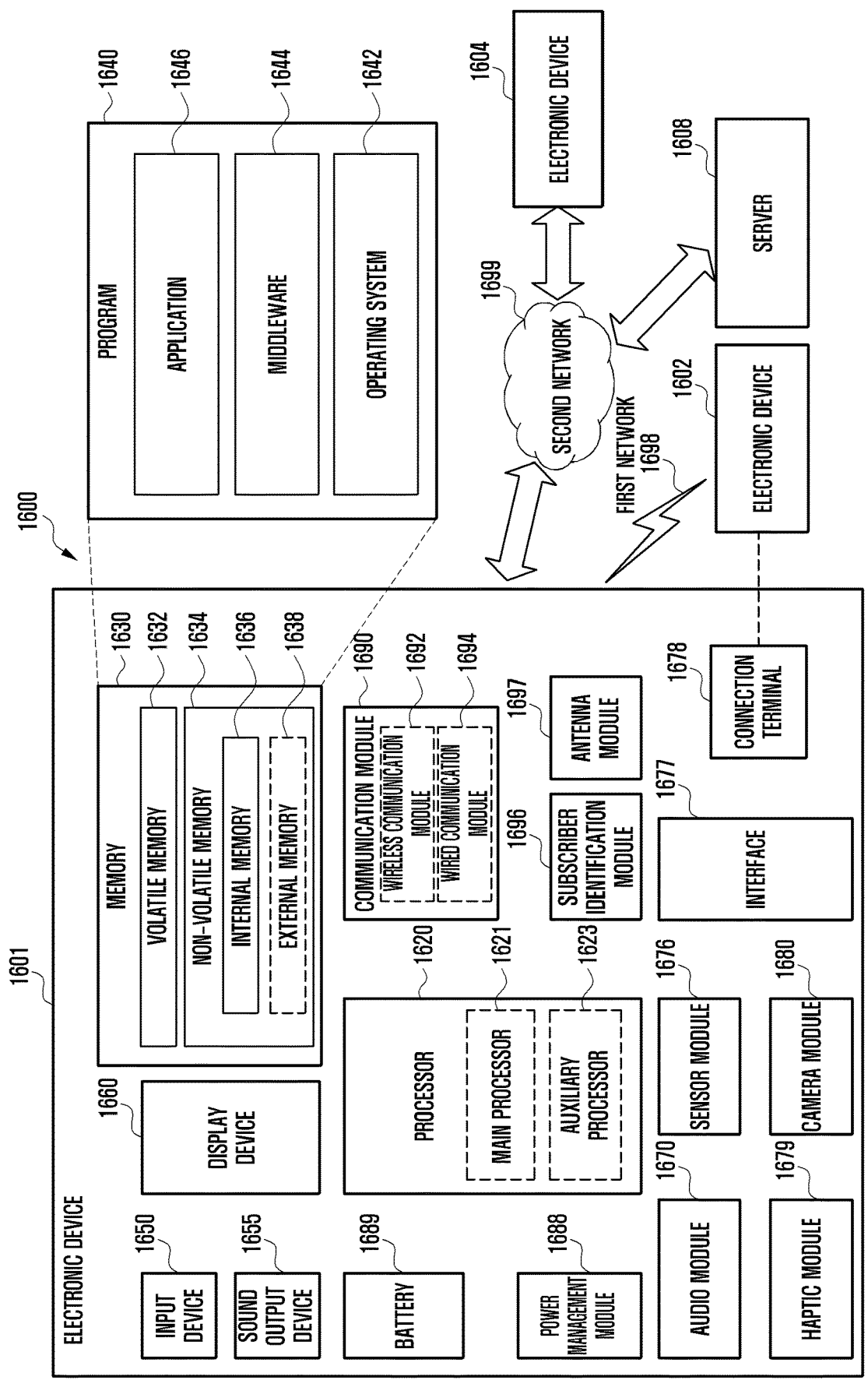
FIG. 16 is a block diagram illustrating an example electronic device in a network environment according to an embodiment.

FIG. 16 is a block diagram illustrating an example electronic device 1601 in a network environment 1600 according to various embodiments. Referring to FIG. 16, the electronic device 1601 in the network environment 1600 may communicate with an electronic device 1602 via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) 1696, or an antenna module 1697.

In some embodiments, at least one (e.g., the display device 1660 or the camera module 1680) of the components may be omitted from the electronic device 1601, or one or more other components may be added in the electronic device 1601. In some embodiments, some of the components may be implemented as single integrated circuitry. For example, the sensor module 1676 (e.g., a fingerprint sensor, an iris sensor, or an illuminance sensor) may be implemented as embedded in the display device 1660 (e.g., a display).

The processor 1620 may execute, for example, software (e.g., a program 1640) to control at least one other component (e.g., a hardware or software component) of the electronic device 1601 coupled with the processor 1620, and may perform various data processing or computation. According to an example embodiment, as at least part of the data processing or computation, the processor 1620 may load a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input device 1650 may receive a command or data to be used by other component (e.g., the processor 1620) of the electronic device 1601, from the outside (e.g., a user) of the electronic device 1601. The input device 1650 may include, for example, a microphone, a mouse, a keyboard, or a digital pen (e.g., a stylus pen).

The sound output device 1655 may output sound signals to the outside of the electronic device 1601. The sound output device 1655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. According to an embodiment, the display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. According to an embodiment, the audio module 1670 may obtain the sound via the input device 1650, or output the sound via the sound output device 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to an example embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. According to an embodiment, the antenna module 1697 may include an antenna including a radiating element including a conductive material or a conductive pattern formed in or on a substrate (e.g., PCB). According to an embodiment, the antenna module 1697 may include a plurality of antennas. In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

An electronic device (e.g., first intelligent server 200 of FIG. 5) configured to support a first speech-based intelligent agent according to various example embodiments of the disclosure may include: a communication circuit, a processor operatively connected to the communication circuit, and a memory operatively connected to the processor. According to various example embodiments, the memory may store instructions which, when executed, cause the processor to control the electronic device to: receive speech data from a user terminal (e.g., user terminal 100 of FIG. 5) through the communication circuit, process the speech data to generate text data, identify a device intended to be controlled through analysis of the text data, receive information on an intelligent agent supported by the identified device from a first external server (e.g., IoT server 500 of FIG. 5) through the communication circuit, and determine whether to transmit the speech data to a second external server (e.g., second intelligent server 600 of FIG. 5) supporting a second speech-based intelligent agent based on the information on the intelligent agent supported by the identified device.

In the electronic device according to various example embodiments of the disclosure, the instructions, when executed, may cause the processor to control the electronic device to: determine a domain of the speech data through the analysis of the text data, and identify the device intended to be controlled based on the determined domain.

In the electronic device according to various example embodiments of the disclosure, the instructions, when executed, may cause the processor to control the electronic device to determine an intent included in the speech data and parameters corresponding to the intent through the analysis of the text data in response to a case where the identified device supports the first speech-based intelligent agent.

In the electronic device according to various example embodiments of the disclosure, the instructions, when executed, may cause the processor to control the electronic device to: transmit the speech data to the second external server through the communication circuit in response to the identified device supporting the second speech-based intelligent agent.

In the electronic device according to various example embodiments of the disclosure, the instructions, when executed, may cause the processor to control the electronic device to: transmit a transmission complete message to the user terminal through the communication circuit in response to the processor transmitting the speech data to the second external server.

In the electronic device according to various example embodiments of the disclosure, the instructions, when executed, may cause the processor to control the electronic device to: receive a speech command complete message related to the speech data from the second external server through the communication circuit, and transmit the speech command complete message to the user terminal.

In the electronic device according to various example embodiments of the disclosure, the instructions, when executed, may cause the processor to control the electronic device to: receive information on at least one device registered in an account and information on an intelligent agent supported by the at least one device from the first external server.

In the electronic device according to various example embodiments of the disclosure, the instructions, when executed, may cause the processor to control the electronic device to: request the information on the intelligent agent supported by the identified device from the first external server through the communication circuit based on identifying the device intended to be controlled, and receive the information on the intelligent agent supported by the identified device from the first external server through the communication circuit in response to the request.

According to various example embodiments of the disclosure, an electronic device (e.g., first intelligent server 200 of FIG. 6) configured to support a first speech-based intelligent agent may include: a communication circuit, a processor operatively connected to the communication circuit, and a memory (database 235 of FIG. 6) operatively connected to the processor. According to various example embodiments, the memory may store information on at least one device registered in an account and information on an intelligent agent supported by the at least one device, and the memory may store instructions which, when executed, cause the processor to control the electronic device to: receive speech data from a user terminal (e.g., user terminal 100 of FIG. 6) through the communication circuit, process the speech data to generate text data, identify a device intended to be controlled through analysis of the text data, identify information on an intelligent agent supported by the identified device based on the information on the at least one device registered in the account and the information on the intelligent agent supported by the at least one device stored in the memory, and determine whether to transmit the speech data to an external server (e.g., second intelligent server of FIG. 6) supporting a second speech-based intelligent agent based on the identified information through the communication circuit.

In the electronic device according to various example embodiments of the disclosure, the information on the at least one device registered in the account may include a name of the at least one device registered in the first speech-based intelligent agent and the second speech-based intelligent agent, respectively.

In the electronic device according to various example embodiments of the disclosure, the instructions, when executed, may cause the processor to control the electronic device to: determine a domain of the speech data through the analysis of the text data, and identify the device intended to be controlled based on the determined domain.

In the electronic device according to various example embodiments of the disclosure, the instructions, when executed, may cause the processor to control the electronic device to: determine an intent included in the speech data and parameters corresponding to the intent through the analysis of the text data in response to the identified device supporting the first speech-based intelligent agent.

In the electronic device according to various example embodiments of the disclosure, the instructions, when executed, may cause the processor to control the electronic device to: transmit the speech data to the external server through the communication circuit in response to the identified device supporting the second speech-based intelligent agent.

In the electronic device according to various example embodiments of the disclosure, the instructions, when executed, may cause the processor to control the electronic device to: transmit a transmission complete message to the user terminal through the communication circuit in response to the processor transmitting the speech data to the external server.

In the electronic device according to various example embodiments of the disclosure, the instructions, when executed, may cause the processor to control the electronic device to: receive a user's speech command complete message related to the user's speech data from the external server through the communication circuit, and transmit the user's speech command complete message to the user terminal.

According to various example embodiments of the disclosure, an electronic device (e.g., first user terminal 70 of FIG. 7) configured to support a first speech-based intelligent agent may include: a communication circuit (e.g., communication interface 110 of FIG. 1), a microphone (e.g., microphone 120 of FIG. 1), a processor (e.g., processor 160 of FIG. 1) operatively connected to the communication circuit and the microphone, and a memory (e.g., database 740 of FIG. 7 or memory 150 of FIG. 1) operatively connected to the processor. According to various embodiments, the memory may store information on at least one device registered in an account and information on an intelligent agent supported by the at least one device, and the memory may store instructions which, when executed, cause the processor to control the electronic device to: receive speech data through the microphone, process the speech data to generate text data, identify a device intended to be controlled through analysis of the text data, identify information on an intelligent agent supported by the identified device based on the information on the at least one device registered in the account and the information on the intelligent agent supported by the at least one device stored in the memory, and determine whether to transmit the speech data to an external electronic device (e.g., second user terminal 80 of FIG. 7) supporting a second speech-based intelligent agent based on the information on the intelligent agent supported by the identified device through the communication circuit.

In the electronic device according to various example embodiments of the disclosure, the instructions, when executed, may cause the processor to control the electronic device to: transmit the speech data to the external electronic device through the communication circuit in response to the identified device supporting the second speech-based intelligent agent.

In the electronic device according to various example embodiments of the disclosure, the electronic device may further include a speaker (e.g., speaker 130 of FIG. 1). In the electronic device according to various example embodiments of the disclosure, the instructions, when executed, may cause the processor to control the electronic device to: output a message including information on that the processor has transmitted the speech data to the external electronic device through the speaker in response to the processor transmitting the speech data to the external electronic device.

In the electronic device according to various example embodiments of the disclosure, the electronic device may further include a display (e.g., display 140 of FIG. 1). In the electronic device according to various example embodiments of the disclosure, the instructions, when executed, may cause the processor to control the electronic device to: output a message including information that the processor has transmitted the speech data to the external electronic device through the display in response to the processor transmitting the speech data to the external electronic device.

In the electronic device according to various example embodiments of the disclosure, the instructions, when executed, may cause the processor to control the electronic device to: output information on the second speech-based intelligent agent supported by the external electronic device and contents of the transmitted speech data through the display.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor(e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. An electronic device configured to support a first speech-based intelligent agent, comprising:
   a communication circuit;
   a processor operatively connected to the communication circuit; and
   a memory operatively connected to the processor,
   wherein the memory stores instructions which, when executed, cause the processor to control the electronic device to:
   receive speech data from a user terminal through the communication circuit,
   process the speech data to generate text data;
   identify a device intended to be controlled through analysis of the text data,
   receive information on an intelligent agent supported by the identified device from a first external server through the communication circuit, and determine whether to transmit the speech data to a second external server supporting a second speech-based intelligent agent based on the information on the intelligent agent supported by the identified device.

2. The electronic device of claim 1, wherein the instructions, when executed, further cause the processor to control the electronic device to:
determine a domain of the speech data through the analysis of the text data, and
identify the device intended to be controlled based on the determined domain.

3. The electronic device of claim 2, wherein the instructions, when executed, further cause the processor to control the electronic device to: determine an intent included in the speech data and parameters corresponding to the intent through the analysis of the text data in response to the identified device supporting the first speech-based intelligent agent.

4. The electronic device of claim 1, wherein the instructions, when executed, further cause the processor to control the electronic device to: transmit the speech data to the second external server through the communication circuit in response to the identified device supporting the second speech-based intelligent agent.

5. The electronic device of claim 4, wherein the instructions, when executed, further cause the processor to control the electronic device to: transmit a transmission complete message to the user terminal through the communication circuit in response to the processor transmitting the speech data to the second external server.

6. The electronic device of claim 4, wherein the instructions, when executed, further cause the processor to control the electronic device to: receive a speech command complete message related to the speech data from the second external server through the communication circuit, and transmit the speech command complete message to the user terminal.

7. The electronic device of claim 1, wherein the instructions, when executed, further cause the processor to control the electronic device to: receive information on at least one device registered in an account and information on an intelligent agent supported by the at least one device from the first external server.

8. The electronic device of claim 1, wherein the instructions, when executed, further cause the processor to control the electronic device to:
request the information on the intelligent agent supported by the identified device from the first external server through the communication circuit based on identifying the device intended to be controlled, and
receive the information on the intelligent agent supported by the identified device from the first external server through the communication circuit in response to the request.

9. An electronic device configured to support a first speech-based intelligent agent, comprising:
a communication circuit;
a processor operatively connected to the communication circuit; and
a memory operatively connected to the processor,
wherein the memory stores information on at least one device registered in an account and information on an intelligent agent supported by the at least one device, and
the memory storing instructions which, when executed, cause the processor to control the electronic device to:
receive speech data from a user terminal through the communication circuit,
process the speech data to generate text data,
identify a device intended to be controlled through analysis of the text data,
identify information on an intelligent agent supported by the identified device based on the information on the at least one device registered in the account and the information on the intelligent agent supported by the at least one device stored in the memory, and
determine whether to transmit the speech data to an external server supporting a second speech-based intelligent agent based on the identified information through the communication circuit.

10. The electronic device of claim 9, wherein the information on the at least one device registered in the account comprises a name of the at least one device registered in the first speech-based intelligent agent and the second speech-based intelligent agent, respectively.

11. The electronic device of claim 9, wherein the instructions, when executed, further cause the processor to control the electronic device to:
determine a domain of the speech data through the analysis of the text data, and
identify the device intended to be controlled based on the determined domain.

12. The electronic device of claim 11, wherein the instructions, when executed, further cause the processor to control the electronic device to: determine an intent included in the speech data and parameters corresponding to the intent through the analysis of the text data in response to the identified device supporting the first speech-based intelligent agent.

13. The electronic device of claim 9, wherein the instructions, when executed, further cause the processor to control the electronic device to: transmit the speech data to the external server through the communication circuit in response to the identified device supporting the second speech-based intelligent agent.

14. The electronic device of claim 13, wherein the instructions, when executed, further cause the processor to control the electronic device to: transmit a transmission complete message to the user terminal through the communication circuit in response to the processor transmitting the speech data to the external server.

15. The electronic device of claim 13, wherein the instructions, when executed, further cause the processor to control the electronic device to: receive a speech command complete message related to the speech data from the external server through the communication circuit, and transmit the speech command complete message to the user terminal.

16. An electronic device configured to support a first speech-based intelligent agent, comprising:
a communication circuit;
a microphone;
a processor operatively connected to the communication circuit and the microphone; and
a memory operatively connected to the processor,
wherein the memory is configured to store information on at least one device registered in an account and information on an intelligent agent supported by the at least one device, and
the memory stores instructions which, when executed, cause the processor to control the electronic device to:
receive speech data through the microphone,
process the speech data to generate text data, identify a device intended to be controlled through analysis of the text data, identify information on an intelligent agent supported by the identified device based on the information on the at least one device registered in the account and the information on the intelligent agent supported by the at least one device stored in the memory, and determine whether to transmit the speech data to an external electronic device supporting a second speech-based intelligent agent based on the information on the intelligent agent supported by the identified device through the communication circuit.

17. The electronic device of claim 16, wherein the instructions, when executed, further cause the processor to control the electronic device to: transmit the speech data to the external electronic device through the communication circuit in response to the identified device supporting the second speech-based intelligent agent.

18. The electronic device of claim 17, further comprising a speaker, wherein the instructions, when executed, cause the processor to control the electronic device to: output a message including information that the processor has transmitted the speech data to the external electronic device through the speaker in response to the processor transmitting the speech data to the external electronic device.

19. The electronic device of claim 17, further comprising a display, wherein the instructions, when executed, cause the processor to control the electronic device to: output a message including information that the processor has transmitted the speech data to the external electronic device through the display in response to the processor transmitting the speech data to the external electronic device.

20. The electronic device of claim 19, wherein the instructions, when executed, further cause the processor to control the electronic device to: output information on the second speech-based intelligent agent supported by the external electronic device and contents of the transmitted speech data through the display.

* * * * *